US009514366B2

(12) United States Patent
Schweid et al.

(10) Patent No.: US 9,514,366 B2
(45) Date of Patent: Dec. 6, 2016

(54) VEHICLE DETECTION METHOD AND SYSTEM INCLUDING IRRELEVANT WINDOW ELIMINATION AND/OR WINDOW SCORE DEGRADATION

(71) Applicant: Xerox Corporation, Norwalk, CT (US)

(72) Inventors: Stuart Alan Schweid, Pittsford, NY (US); Orhan Bulan, Henrietta, NY (US); Yao Rong Wang, Webster, NY (US); Wencheng Wu, Webster, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 269 days.

(21) Appl. No.: 14/171,022

(22) Filed: Feb. 3, 2014

(65) Prior Publication Data
US 2015/0222859 A1 Aug. 6, 2015

(51) Int. Cl.
H04N 7/18 (2006.01)
G06K 9/00 (2006.01)

(52) U.S. Cl.
CPC ....... *G06K 9/00624* (2013.01); *G06K 9/00771* (2013.01); *G06K 2209/23* (2013.01)

(58) Field of Classification Search
CPC ...................... G06K 2209/23; G06K 9/00624
USPC ........................................................ 348/148
See application file for complete search history.

(56) References Cited

U.S. PATENT DOCUMENTS

| 5,563,962 | A * | 10/1996 | Peters et al. ................. 382/261 |
| 6,327,581 | B1 * | 12/2001 | Platt .............................. 706/12 |
| 8,682,036 | B2 * | 3/2014 | Wang .................. G06K 9/3258 340/937 |
| 8,971,581 | B2 * | 3/2015 | Wu .................... G06K 9/00785 340/932.2 |
| 9,043,083 | B2 * | 5/2015 | Kadowaki ................ B60R 1/00 340/932.2 |
| 9,171,213 | B2 * | 10/2015 | Bulan ................ G06K 9/00785 |
| 9,317,752 | B2 * | 4/2016 | Bulan ................ G06K 9/00771 |
| 9,363,483 | B2 * | 6/2016 | Bulan ...................... H04N 7/18 |
| 2002/0159642 | A1 * | 10/2002 | Whitney ...................... 382/225 |
| 2003/0126606 | A1 * | 7/2003 | Buczak .................. H04N 7/163 725/46 |
| 2004/0037465 | A1 * | 2/2004 | Krause ................. G06K 9/0063 382/199 |
| 2008/0273752 | A1 * | 11/2008 | Zhu et al. ..................... 382/103 |
| 2010/0054540 | A1 * | 3/2010 | Brown ............... G06K 9/00369 382/107 |
| 2010/0158409 | A1 * | 6/2010 | Sundareson et al. ......... 382/282 |
| 2011/0150329 | A1 * | 6/2011 | Lepine .................. G06T 3/4038 382/165 |
| 2011/0273310 | A1 * | 11/2011 | Kadowaki .......... B62D 15/0285 340/932.2 |
| 2012/0027252 | A1 * | 2/2012 | Liu et al. ...................... 382/103 |
| 2012/0037252 | A1 * | 2/2012 | Stephan .................. F16L 25/12 137/798 |
| 2013/0060421 | A1 * | 3/2013 | Kadowaki ................. B60R 1/00 701/36 |
| 2013/0266190 | A1 * | 10/2013 | Wang ................... G06K 9/3258 382/105 |

(Continued)

OTHER PUBLICATIONS

Haselhoff et al, A vehicle detection system based on Haar and Triangle Features, 2009.*

(Continued)

*Primary Examiner* — Shan Elahi
(74) *Attorney, Agent, or Firm* — Fay Sharpe LLP

(57) ABSTRACT

This disclosure provides vehicle detection methods and systems including irrelevant search window elimination and/or window score degradation. According to one exemplary embodiment, provided is a method of detecting one or more parked vehicles in a video frame, wherein candidate search windows are limited to one or more predefined window shapes. According to another exemplary embodiment, the method includes degrading a classification score of a candidate search window based on aspect ratio, window overlap area and/or a global maximal classification.

25 Claims, 18 Drawing Sheets

(56) References Cited

U.S. PATENT DOCUMENTS

| | | | | |
|---|---|---|---|---|
| 2014/0036076 | A1* | 2/2014 | Nerayoff | H04N 7/181 348/148 |
| 2014/0233826 | A1* | 8/2014 | Agaian et al. | 382/133 |
| 2014/0266803 | A1* | 9/2014 | Bulan | G06K 9/00785 340/932.2 |
| 2014/0270381 | A1* | 9/2014 | Wu | G06K 9/00785 382/104 |
| 2014/0355822 | A1* | 12/2014 | Choi | G06K 9/00812 382/103 |
| 2014/0375804 | A1* | 12/2014 | Bulan | H04N 7/18 348/148 |
| 2014/0376769 | A1* | 12/2014 | Bulan | G06K 9/00771 382/103 |
| 2015/0363930 | A1* | 12/2015 | Xu | G06T 7/0014 382/128 |
| 2016/0093214 | A1* | 3/2016 | Wu | G08G 1/147 348/148 |

OTHER PUBLICATIONS

Haddon et al, Simultaneous Region and Edge Segmentation of Infrared Images using Non-Maximal Suppression for Edge Thinning, 1990.*
G. Csurka et al., "Visual Categorization with Bags of Keypoints", ECCV SLCV, 2004, 16 pages.
A. Neubeck et al., "Efficient Non-Maximum Suppression", ICPR, 2006, 6 pages.
"Regression Analysis", Wikipedia, http://en.wikipedia.org/wiki/Regression_analysis, 15 pages, printed Jan. 31, 2014.
Z. Zhang, "A flexible new technique for camera calibration," IEEE Trans. On Pattern Analysis and Machine Intelligence, vol. 22(11), 1330-1334 (2000).
C. Stauffer et al., "Adaptive background mixture models for real-time tracking", In Proc. of the 1999 Conference on Computer Vision and Pattern Recognition (CVPR '99), 6 pages, 1999.
N. M Oliver et al., "A Bayesian Computer Vision System For Modeling Human Interactions", IEEE Transactions on PAMI, pp. 831-843, Aug. 2000.
U.S. Appl. No. 13/441,269, filed Apr. 6, 2012, Bulan et al.
U.S. Appl. No. 13/835,386, filed Mar. 15, 2013, Bulan et al.
U.S. Appl. No. 13/836,310, filed Mar. 15, 2013, Wu et al.
U.S. Appl. No. 13/461,221, filed May 1, 2012, Bulan et al.
U.S. Appl. No. 13/441,253, filed Apr. 6, 2102, Bulan et al.
U.S. Appl. No. 14/070,812, filed Nov. 4, 2013, Wang et al.
U.S. Appl. No. 13/684,817, filed Nov. 26, 2012, Wang et al.
U.S. Appl. No. 13/913,606, filed Jun. 10, 2013, Wu et al.
U.S. Appl. No. 13/922,091, filed Jun. 19, 2013, Bulan et al.
U.S. Appl. No. 13/861,553, filed Apr. 12, 2013, Bulan et al.
U.S. Appl. No. 13/918,364, filed Jun. 14, 2013, Wang et al.
B.P.L. Lo et al., "Automatic congestion detection system for underground platforms," Proceedings of 2001 Int. Symposium on Intell. Multimedia, Video and Speech Processing, pp. 158-161, May 2-4, 2001 Hong Kong.
Iain E. Richardson, "The H.264 Advanced Video Compression Standard," 2010 John Wiley & Sons Ltd., 350 pages.
F. Perronnin et al., "Improving the Fisher Kernel for Large-Scale Image Classification", ECCV, 2010, 14 pages.
N. Dalal et al., "Histograms of Oriented Gradients for Human Detection", CVPR 2005, 7 pages.
T. Ojala et al., "A Comparative Study of Texture Measures with Classification Based on Feature Distributions", 1996 Pattern Recognition, vol. 29, pp. 51-59.
M. Nilsson et al., "Face Detection Using Local SMQT Features and Split Up SNoW Classifier", IEEE International Conference on Acoustics, Speech, and Signal Processing, 2007, 4 pages.
F. Perronnin et al., "Fisher Kernels on Visual Vocabularies for Image Categorization", CVPR, 2007, 8 pages.

* cited by examiner

VEHICLE DETECTION METHOD AND SYSTEM INCLUDING IRRELEVANT WINDOW ELIMINATION AND/OR WINDOW SCORE DEGRADATION

BACKGROUND

The present disclosure relates to a video-based method and system for efficient vehicle detection/localization in still images obtained from a fixed video camera. The disclosed method and system are applicable to parking space management. However, it is to be appreciated that the present exemplary embodiments are also applicable to other like applications.

One challenge that parking management companies face while managing on-street parking is an accurate detection of available spaces. Conventional methods for detecting vehicle occupancy in parking spaces include non-video based sensing solutions. For example, "puck-style" sensors, shown in FIG. 1, typically use magnetometer readings to sense when a vehicle is detected in a parking space. Ultrasonic sensors, as shown in FIG. 2, operate by sending and receiving high frequency sonic waves and evaluating a parking area based on processing a signal that has been reflected back to the ultrasonic sensor. The detected information is wirelessly communicated to interested parties. One disadvantage associated with these types of sensor-based methods is a high cost for installation and maintenance of the sensors. In addition, the maintenance or replacement of a sensor may reduce parking efficiency if a parking space is made unavailable for the service work.

Another method being explored is a video-based solution. This method is shown in FIG. 3 and includes monitoring on-street parking spaces using non-stereoscopic video cameras. The cameras output a binary signal to a processor, which uses the data for determining occupancies of the parking spaces.

One shortcoming of both technologies is that they are designed for, and limited to, single-space parking configurations. On-street parking can be provided in two different configurations. A first configuration is shown in FIG. 4 and includes single-space parking, also known as stall-based parking, in which each parking space is defined in a parking area by clear boundaries. The parking spaces are typically marked by lines (shown in phantom) that are painted on the road surface to designate one parking space per vehicle. The second configuration is shown in FIG. 5 and includes multi-space parking, in which a long section of street is designated as a parking area to accommodate multiple vehicles. In this configuration, there are no pre-defined boundaries that designate individual parking stalls, so a vehicle can park at any portion extending along the parking area. In many instances, the multi-space parking configurations are more efficient because, when spaces are undesignated, drivers aim to fit more vehicles in a multi-space parking area having a same length as a single-space parking area.

At present, many departments of transportation are transitioning from single-space parking configurations to the multi-space parking configurations. Cities are eliminating parking meters and single-space parking configurations to reduce maintenance and other costs. The in-ground/ultrasonic sensor-based methods are best suited for parking areas where painted lines typically demark a defined parking space for a single vehicle. However, an incorporation of the in-ground/ultrasonic sensor-based methods for use in multi-space parking configurations is conceptually difficult and expensive to continue.

Given the comparatively lower cost of a video surveillance camera, a video-based solution offers a better value if it is incorporated into a management scheme for monitoring multi-space parking configurations, as well as some applications of single-space street parking. Another advantage of a video-based solution is that one video camera can typically monitor and track several parking spots, whereas multiple in-ground/ultrasonic sensors may be needed to reliably monitor one parking space in the multi-space parking configuration. Additionally, maintenance of the video cameras is less disruptive to street traffic than maintenance of in-ground sensors.

INCORPORATION BY REFERENCE

U.S. patent application Ser. No. 13/441,269, filed Apr. 6, 2012 by Bulan et al. and entitled "System and Method For Available Parking Space Estimation For Multispace On-Street Parking";

U.S. patent application Ser. No. 13/835,386, filed Mar. 15, 2013, by Bulan et al. and entitled "Two-Dimensional and Three-Dimensional Sliding Window-Based Methods and Systems for Detecting Vehicles";

A. Neubeck and L. V. Gool, "Efficient Non-Maximum Suppression", ICPR, 2006, 6 pages;

U.S. patent application Ser. No. 13/836,310, filed Mar. 15, 2013, by Wu et al., and entitled "Methods and Systems for Automated In-Field Hierarchical Training of a Vehicle Detection System";

N. Dalal and B. Triggs "Histograms of Oriented Gradients for Human Detection", CVPR 2005, 7 pages;

T. Ojala, M. Pietikäinen, and D. Harwood, "A Comparative Study of Texture Measures with Classification Based on Feature Distributions", 1996 Pattern Recognition, vol. 29, pp. 51-59;

M. Nilsson, J. Nordberg, and I. Claesson, "Face Detection Using Local SMQT Features and Split Up SNoW Classifier", *IEEE International Conference on Acoustics, Speech, and Signal Processing*, 2007, 4 pages;

F. Perronnin and C. Dance, "Fisher Kernels on Visual Vocabularies for Image Categorization", CVPR, 2007, 8 pages;

G. Csurka, C. Dance, J. Willamowski, L. Fan and C. Bray, "Visual Categorization with Bags of Keypoints", ECCV SLCV, 2004, 16 pages;

F. Perronnin, J. Sánchez and T. Mensink, "Improving the Fisher Kernel for Large-Scale Image Classification", ECCV, 2010, 14 pages;

"The H.264 Advanced Video Compression Standard," Iain E. Richardson, 2010 John Wiley & Sons Ltd., 25 pages;

C. Stauffer and W. E. L. Grimson. Adaptive background mixture models for real-time tracking. In Proc. of the 1999 Conference on Computer Vision and Pattern Recognition (CVPR '99), 6 pages, 1999;

Oliver, N. M.; Rosario, B.; Pentland, A. P., A Bayesian Computer Vision System For Modeling Human Interactions, IEEE Transactions on PAMI, pages 831-843;

B. P. L. Lo and S. A. Velastin, "Automatic congestion detection system for underground platforms," Proc. of 2001 Int. Symp. on Intell. Multimedia, Video and Speech Processing, pp. 158-161;

Z. Zhang, "A flexible new technique for camera calibration," IEEE Trans. On Pattern Analysis and Machine Intelligence, Vol. 22(11), 1330-1334 (2000);

http://en.wikipedia.org/wiki/Regression_analysis;

U.S. patent application Ser. No. 13/461,221, filed May 1, 2012, by Bulan et al., and entitled "Video-Based Method of Parking Angle Violation Detection";

U.S. patent application Ser. No. 13/441,253, filed Apr. 6, 2012, by Bulan et al., entitled "Video-Based System and Method For Detecting Exclusion Zone Infractions";

U.S. patent application Ser. No. 14/070,812, filed Nov. 4, 2013, by Wang et al., entitled "Method for Object Size Calibration to Aid Vehicle Detection for Video-Based On-Street Parking Technology";

U.S. application Ser. No. 13/684,817, filed Nov. 26, 2012, by Wang et al., and entitled "System and Method for Estimation of Available Parking Space Through Intersection Traffic Counting";

U.S. patent application Ser. No. 13/913,606, filed Jun. 10, 2013, by Wu et al., and entitled Precipitation Removal for Vision-based Parking Management Systems";

U.S. patent application Ser. No. 13/922,091, filed Jun. 19, 2013, by Bulan et al., and entitled "A Method for Available Parking Distance Estimation via Vehicle Side Detection";

U.S. patent application Ser. No. 13/861,553, filed Apr. 12, 2013, by Bulan et al., and entitled "A Wireless Parking Register/Payment and Violation Notification Method and System";

U.S. patent application Ser. No. 13/918,364, filed Jun. 14, 2013, by Wang et al., and entitled "A System and Method for Parking Reservation and Finding Parking Space Suitable for User's Vehicle Size", are incorporated herein by reference in their entirety.

BRIEF DESCRIPTION

In one embodiment of this disclosure, described is a computer implemented method of detecting one or more vehicles in a video frame acquired from a fixed parking occupancy video camera including a field of view associated with a vehicle parking region, the method comprising: a) capturing a video frame from the fixed parking occupancy video, the video frame including a ROI (Region of Interest) oriented by an orientation angle relative to an orientation of an image plane associated with the captured video frame, the ROI including one or more parking spaces of the vehicle parking region; b) performing a sliding window-based search for one or more vehicles within the ROI, the sliding window-based search extracting one or more features associated with each of a plurality of candidate search windows representing a set of windows from which one or more mutually exclusive object bounding boxes are selected, each selected mutually exclusive object bounding box associated with a vehicle not associated with the other mutually exclusive object bounding boxes; c) accessing a classifier to classify each candidate search window as including a vehicle or not including a vehicle; and d) suppressing one or more overlapping classified candidate search windows including a common vehicle to eliminate overlapping candidate search windows from detecting the common vehicle, wherein the classified candidate search windows are limited to candidate search windows of one or more predefined window shapes to exclude search windows limited to a partial detection of a vehicle, and candidate search windows which are not suppressed are considered to be the one or more mutually exclusive object bounding boxes representative of the one or more vehicles detected in the video frame.

In another embodiment of this disclosure, described is a computer implemented method of detecting one or more vehicles in a video frame acquired from a fixed parking occupancy video camera including a field of view associated with a vehicle parking region, the method comprising: a) capturing a video frame from the fixed parking occupancy video, the video frame including a ROI (Region of Interest) oriented by an orientation angle relative to an orientation of an image plane associated with the captured video frame, the ROI including one or more parking spaces of the vehicle parking region; b) performing a sliding window-based search for one or more vehicles within the ROI, the sliding window-based search extracting one or more features associated with each of a plurality of candidate search windows representing a set of windows from which object bounding boxes are selected, each selected object bounding box associated with a vehicle not associated with the other object bounding boxes; c1) accessing a classifier to score each candidate search window with a classification score calculated by the classifier indicating a probability of candidate search window includes a vehicle relative to a plurality of training images used to train the classifier; c2) degrading the classification score of one or more classified overlapping search windows including a common vehicle, the classification score degraded by an amount that is a function of an overlap area of the overlapping search windows and a relative size of each of the overlapping windows; and d) performing a NMS (Non-Maximal Suppression) process to suppress one or more overlapping classified candidate search windows, the NMS process suppressing any overlapping classified candidate search window with a score, degraded or not, below a predetermined threshold, wherein classified candidate search windows which are not suppressed are considered to be object bounding boxes representative of the one or more vehicles detected in the video frame.

In still another embodiment of this disclosure, described is a vehicle detection system associated with a vehicle parking region, the vehicle detection system comprising: a parking occupancy video camera directed towards the vehicle parking region; and a controller operatively associated with the parking occupancy video camera, the controller configured to execute computer instructions to perform a process of detecting a vehicle in a video frame including: a) capturing a video frame from the fixed parking occupancy video, the video frame including a ROI (Region of Interest) oriented by an orientation angle relative to an orientation of an image plane associated with the captured video frame, the ROI including one or more parking spaces of the vehicle parking region; b) performing a sliding window-based search for one or more vehicles within the ROI, the sliding window-based search extracting one or more features associated with each of a plurality of candidate search windows representing a set of windows from which object bounding boxes are selected, each selected object bounding box associated with a vehicle not associated with the other object bounding boxes; c1) accessing a classifier to score each candidate search window with a classification score calculated by the classifier indicating a probability of candidate search window includes a vehicle relative to a plurality of training images used to train the classifier; c2) degrading the classification score of one or more classified overlapping search windows including a common vehicle, the classification score degraded by an amount that is a function of an overlap area of the overlapping search windows and a relative size of each of the overlapping windows; and d) performing a NMS (Non-Maximal Suppression) process to suppress one or more overlapping classified candidate search windows, the NMS process suppressing any overlapping classified candidate search window with a score, degraded or not, below a predetermined threshold, wherein classified candidate search windows which are not suppressed are considered to be object bounding boxes representative of the one or more vehicles detected in the video frame.

DETAILED DESCRIPTION

Video-based parking occupancy detection systems have been developed recently. For example, see U.S. patent application Ser. No. 13/441,269, filed Apr. 6, 2012 by Bulan et al. and entitled "System and Method For Available Parking Space Estimation For Multispace On-Street Parking", wherein parked vehicles are detected by performing a sliding window search along a curb using a linear SVM classifier as disclosed in U.S. patent application Ser. No. 13/835,386, filed Mar. 15, 2013, by Bulan et al. and entitled "Two-Dimensional and Three-Dimensional Sliding Window-Based Methods and Systems for Detecting Vehicles". As a result of the search, each window is classified as "vehicle" or "non-vehicle" by a classifier. Importantly, the process may classify more than one window, typically overlapping windows, as including a common vehicle in the scene. In order to select an optimal window to represent the detected vehicle, a common conventional non-maximum suppression (NMS) technique selects the window with a maximum score and discards the other overlapping windows. See A. Neubeck and L. V. Gool, "Efficient Non-Maximum Suppression", ICPR, 2006, 6 pages. By selecting the window with a maximum score, sometimes partial detection of a parked vehicle can result, which causes error in estimating an available parking distance associated with a parking region. This disclosure provides a method and system to reduce partial detections and improve the overall accuracy of a video based vehicle detection system by eliminating irrelevant "vehicle" windows and/or performing window classification score degradation based on window size characteristics before performing non-maximum suppression.

The method and system disclosed provide improved accuracy of vehicle detection within a region of interest (ROI) associated with fixed cameras. The disclosed method includes an additional step before performing non-maximum suppression to eliminate or exclude irrelevant windows which are classified as including a vehicle during a sliding window search performed by the classifier and/or performing window classification score degradation based on window size characteristics. Alternatively, irrelevant windows can be eliminated during the performance of the sliding window search before calculating a classification score for the irrelevant windows. The window elimination process is performed by exploiting shape attributes, such as aspect ratio and/or physical length of the window. This additional step may be implemented and incorporated into an overall parking occupancy detection system. During tests performed with live-videos from a parking site, it was observed that the disclosed method reduces partial vehicle detections and improves the detection performance of the overall system with minimal additional computation. Notably, even less computation is required if the window removal is done prior to the classification step.

Figure 1:
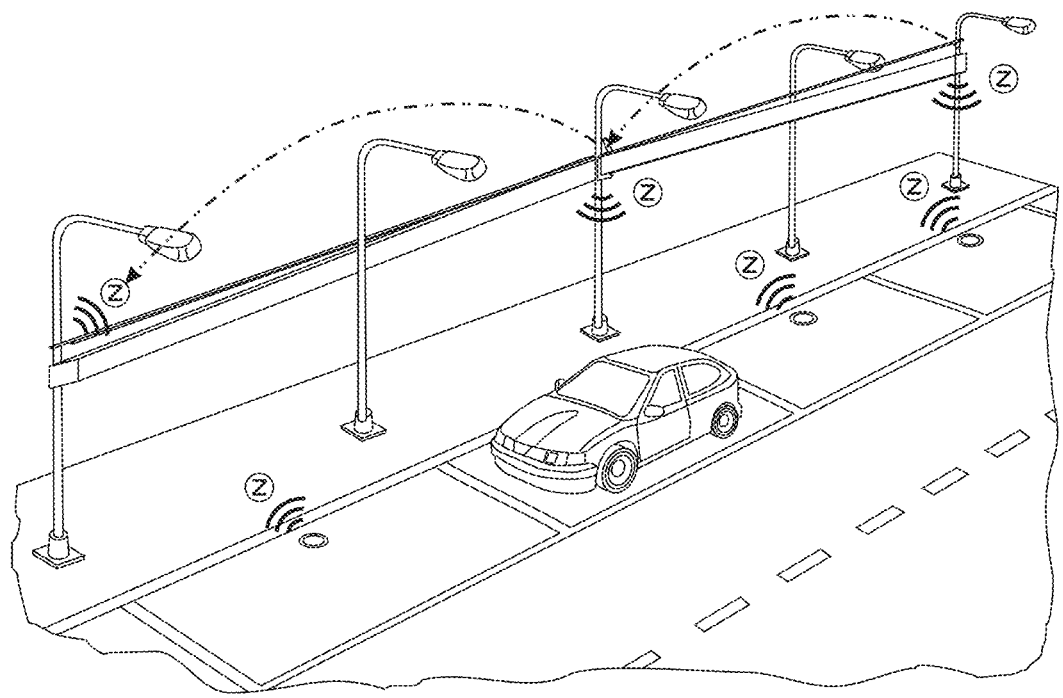
FIG. 1 shows a "puck-style" sensor-based method for detecting parking space occupancy according to the PRIOR ART.
Figure 2:
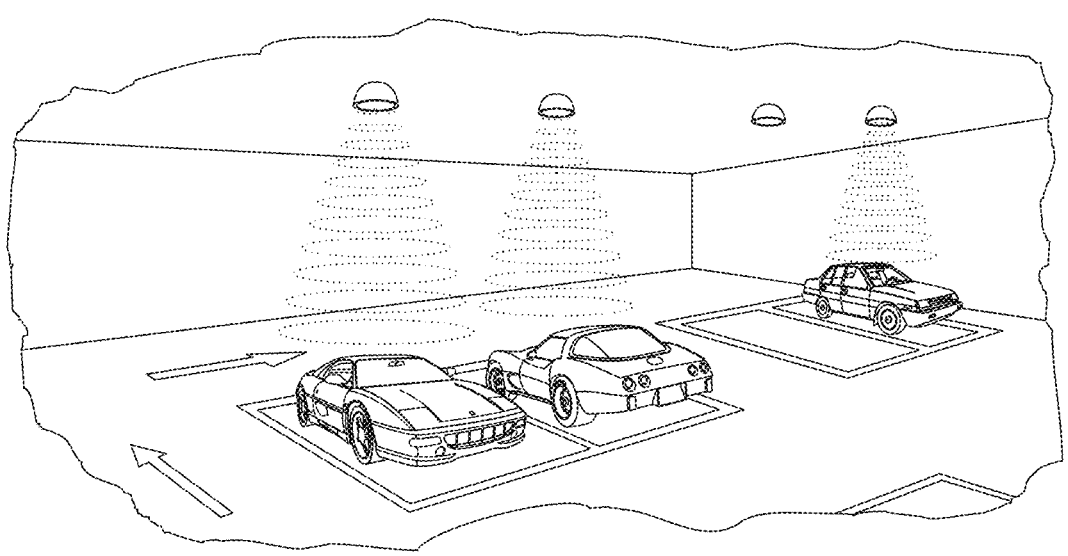
FIG. 2 shows an ultrasonic sensor-based method for detecting parking space occupancy according to the PRIOR ART.
Figure 3:
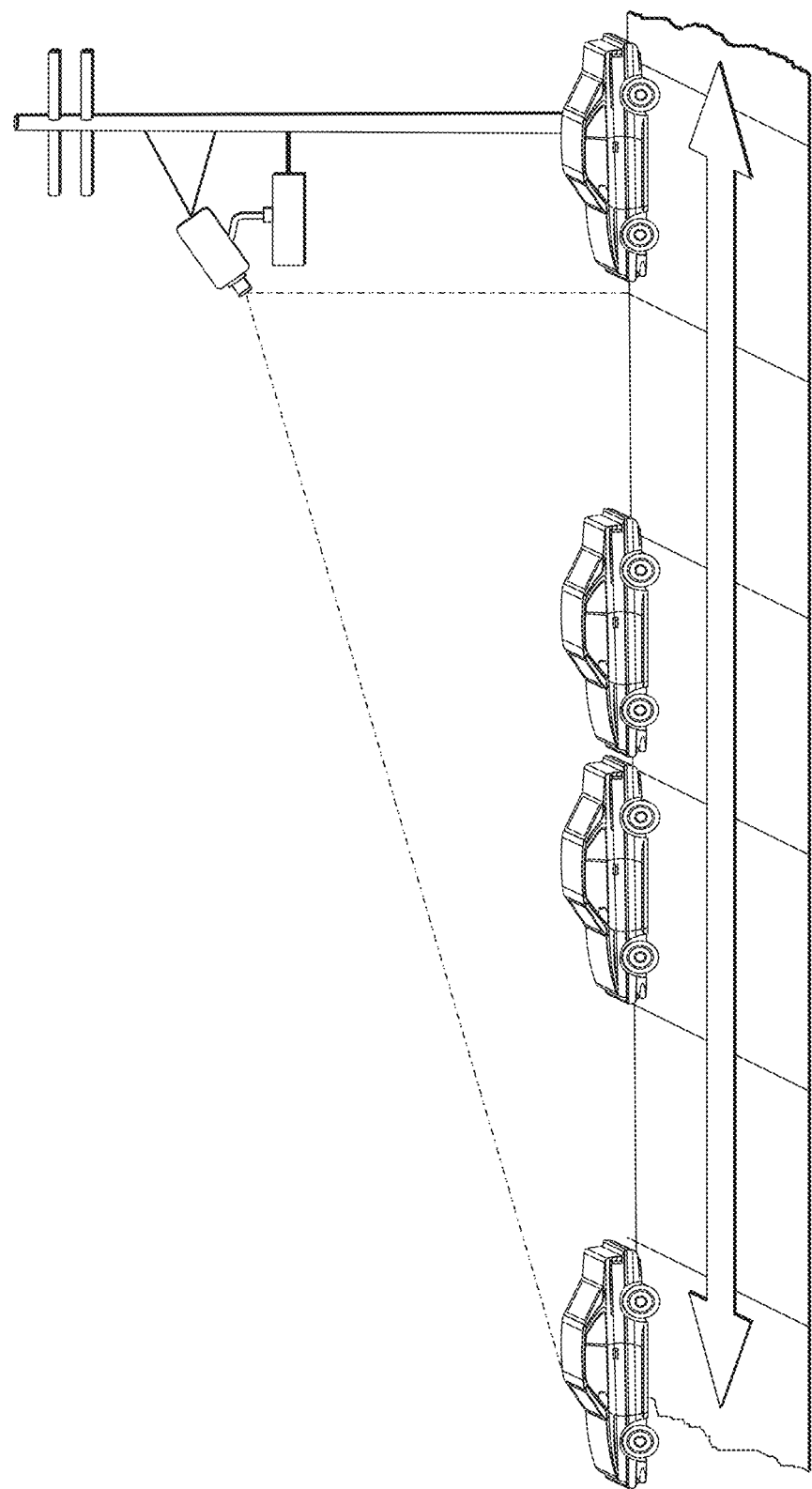
FIG. 3 shows a video-based method for detecting parking space occupancy according to the PRIOR ART.
Figure 4:
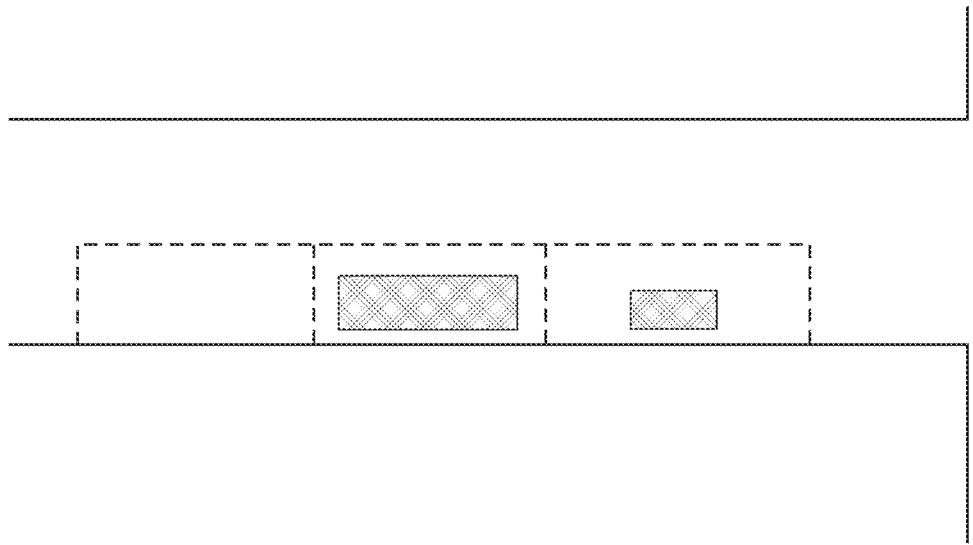
FIG. 4 shows a single-space parking configuration.
Figure 5:
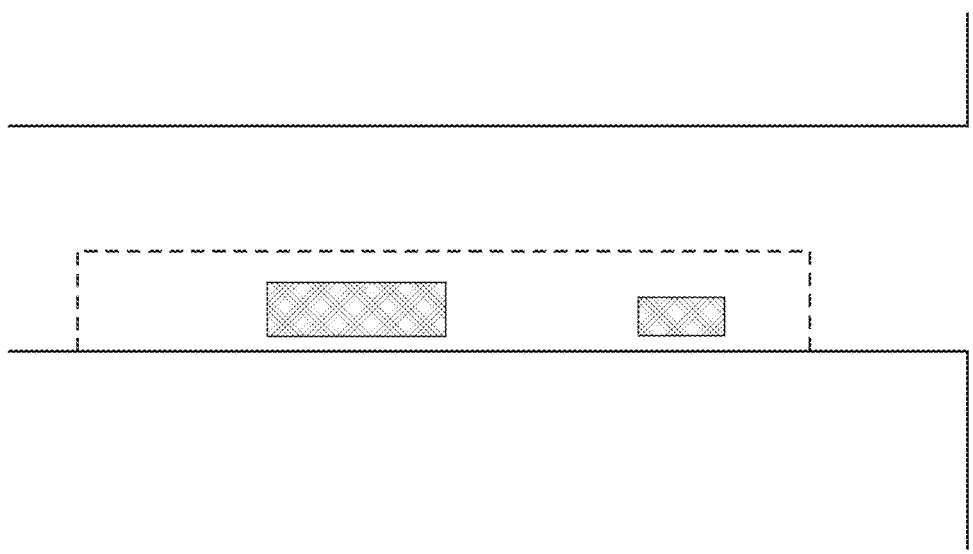
FIG. 5 show a multi-space parking configuration.
Figure 6:
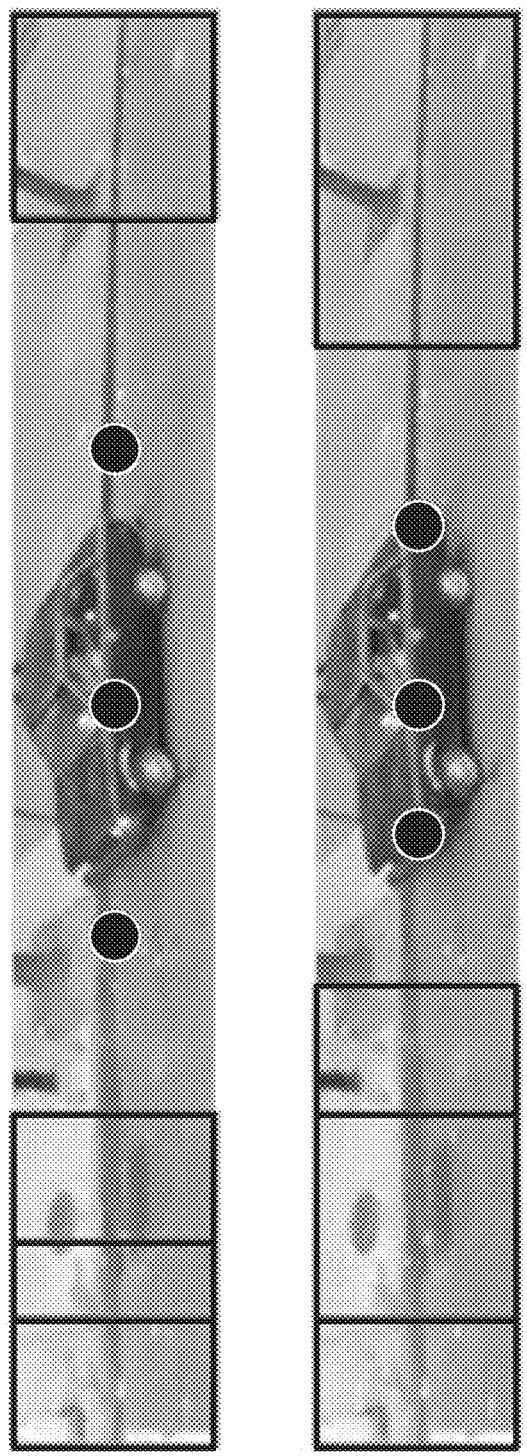
FIG. 6 shows an exemplary ROI (Region of Interest) and corresponding sliding window search according to an exemplary embodiment of this disclosure.

As previously stated, a recent video-based parking occupancy detection system includes efficiently searching for parked vehicles by performing a sliding window search using a classifier, such as an SVM (support vector machine) classifier. See U.S. patent application Ser. No. 13/835,386, filed Mar. 15, 2013, by Bulan et al. and entitled "Two-Dimensional and Three-Dimensional Sliding Window-Based Methods and Systems for Detecting Vehicles". The sliding window search is performed along two dimensions, i.e., x-direction corresponding to window length and y-direction corresponding to window height, as illustrated in FIG. 6. Each search window is classified as "Car" (vehicle) or "non-car" (non-vehicle) by the classifier to find all occurrences of the vehicle.

Importantly, this process can classify more than one search window, typically overlapping, as including a common vehicle in the scene. In order to select the optimal search window to represent the detected vehicle, a typical non-maximum suppression technique selects the window with a maximum classification score and discards other overlapping windows. See A. Neubeck and L. V. Gool, "Efficient Non-Maximum Suppression", ICPR, 2006, 6 pages. However, selecting the search window with a maximum score sometimes leads to partial detection of a parked car, which may cause errors estimating the available parking distance associated with a monitored parking region as illustrated in FIG. 7.

Figure 7:
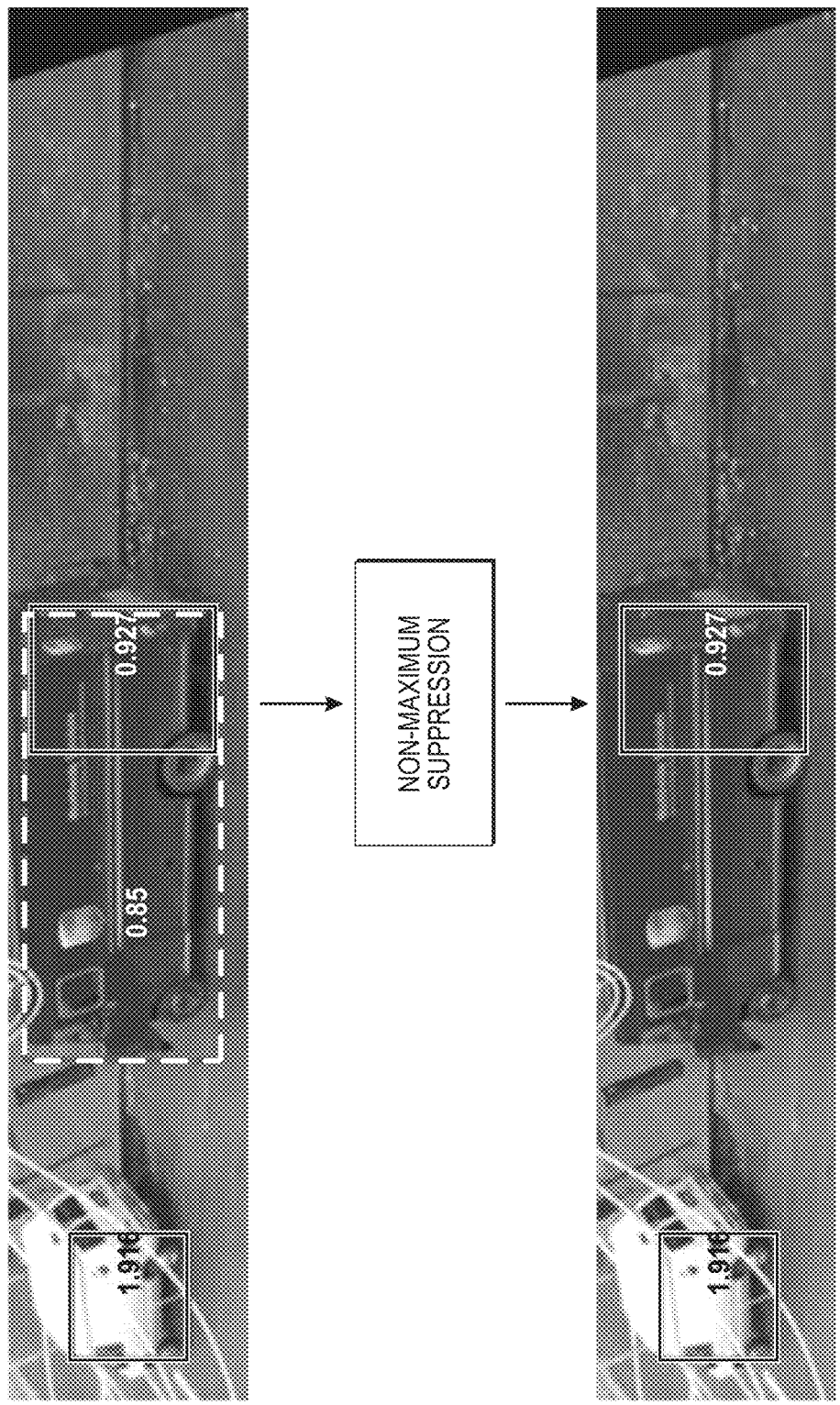
FIG. 7 illustrates a partial detection of a vehicle using a conventional NMS (Non-Maximal Suppressions), where the partial vehicle detection is due to a relatively small window suppressing a relatively large window that is a better representative window of the vehicle.

For the large truck in FIG. 7, two search windows, the dashed and the solid windows, are classified as "vehicle" by the classifier, where the detection threshold is set to 0.8. Even though the classification scores for both windows are higher than the detection threshold, the small window has a relatively higher score of 0.927 as compared to the large window score of 0.85, which better represents the vehicle. However, the large window is suppressed by the small window if conventional non-maximum suppression techniques are used because the small window has a higher score.

This disclosure provides methods and systems to reduce partial vehicle detections, as previously described, and improve the overall accuracy of a video-based parking occupancy detection system by eliminating irrelevant "vehicle" windows before non-maximum suppression and/or performing window classification score degradation or window size characteristics.

Figure 8:
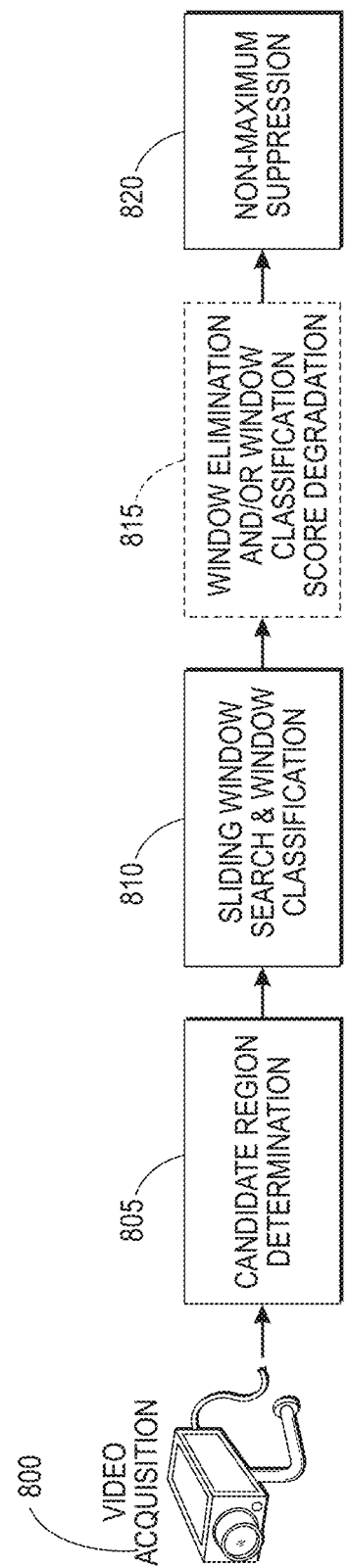
FIG. 8 is a block diagram of an exemplary embodiment of a vehicle detection algorithm incorporating a window elimination process according to this disclosure.

FIG. 8 shows a block diagram of an exemplary method/system of search window elimination and/or window classification score degradation or exclusion, according to this disclosure. Video acquisition comprises a video camera and captures a video of a region of interest. From the captured video, candidate regions are determined at each frame using common video processing techniques, e.g., motion detection, background estimation, etc., where a candidate region is an area where a parked vehicle may exist. See U.S. patent application Ser. No. 13/441,269, filed Apr. 6, 2012, by Bulan et al., and entitled "System and Method for Available Parking Space Estimation for Multispace On-Street Parking". According to one exemplary embodiment, vehicle detection is performed only in these candidate regions using a sliding window search as previously described. Each search window is classified as "vehicle" or "non-vehicle" by using a classifier trained in advance, for example a SVM classifier. See U.S. patent application Ser. No. 13/835,386, filed Mar. 15, 2013, by Bulan et al. and entitled "Two-Dimensional and Three-Dimensional Sliding Window-Based Methods and Systems for Detecting Vehicles". The additional step provided herein may be implemented at one of a plurality of different stages during processing. For example, irrelevant window elimination and/or window classification score degradation can be performed after classification where it eliminates irrelevant windows and/or degrades window classification scores that are classified as "vehicle" by the classifier. Alternatively, irrelevant window elimination and/or window classification score degradation can be implemented within the sliding window search process or window classification process. For purposes of the following description, each sliding window is examined by the provided window elimination step before passing that window to a window classification process, e.g., SVM classifier.

Considering, for example, the small "vehicle" window for the truck in FIG. 7, it is an irrelevant window because is it highly unlikely that there is a vehicle of that shape at that window location. Hence, the accuracy of full vehicle detection can be improved by eliminating this unlikely window. Alternatively, window elimination can be merged into the sliding window search to eliminate irrelevant windows before calculating the classification score for these windows. Depending on the classifier, e.g., linear or non-linear, feature extraction and the window elimination methods, either of these constructions can be advantageous. Subsequently, non-maximum suppression is performed on the remaining "vehicle" windows after the completion of the irrelevant window elimination process.

The window elimination and/or window classification score degradation can be implemented in one or more of several possible ways, including but not limited to:

Fixed Aspect Ratio Thresholding: Calculating the aspect ratio of search windows and eliminating the windows whose aspect ratio is smaller than a predefined threshold, or is incompatible with the vehicles that typically park in the region of interest.

Adaptive Aspect Ratio Thresholding: Determining the aspect ratio threshold adaptively along a curb in the parking region of interest and eliminating a search window if its aspect ratio is smaller than the threshold defined for the window location. The adaptation is used to compensate for variations in the ratio of pixels to physical length due to perspective.

Physical Length Thresholding: Calculating the physical length of search windows and eliminating the windows whose length is smaller than a predefined threshold, e.g., the smallest vehicle length.

Surrogated Physical Length Thresholding: Calculating a surrogate pixel width of search windows based on a learned look-up table (LUT) and eliminating the windows whose length is smaller than a predefined threshold eliminating the windows whose length is smaller than a predefined threshold, e.g., 90% of the smallest learned vehicle length in pixels.

Classifier Score Degrading: Degrading the classifier score of a search window as a function of the aspect ratio, either fixed or adaptive. This eliminates the hard decision of eliminating potential candidates while biasing the score to favor candidate windows with aspect ratios more aligned with typical car dimensions. This approach may be less prone to errors when an unusually shaped vehicle does appear.

Below are described the processes illustrated in FIG. 8.

A) Video Acquisition 800

Video acquisition includes a video camera that captures video of a region of interest. If monitoring at night is desired, NIR (Near Infrared) capabilities are beneficial, unless external sources of illumination are used. Notably, relatively inexpensive NIR cameras are readily available, as the low-end portion of the near-infrared spectrum (700 nm-1000 nm) can be captured with equipment that captures visible light.

B) Candidate Region Determination 805

Performing a window-based search in all the frames included in a captured video is computationally expensive, especially if the resolution and the frame rate of the captured video is relatively high. In order to satisfy a real-time processing requirement for a video-based parking occupancy detection system, captured video is typically processed to identify candidate regions where a parked vehicle may normally be parked. Vehicle detection is only performed in these candidate regions to increase the computational efficiency, and improve the overall detection performance of the video-based parking occupancy detection system. Detection accuracy is improved because performing vehicle detection only in candidate regions reduces the associated search space and hence, eliminates possible false detections from non-candidate regions in the ROI. The candidate regions can be manually selected at the start of video processing and then passed to subsequent frames or may be identified in several ways including the following:

Tracking a vehicle to a parking spot, where the tracking is performed using a coherent cluster of motion vectors, e.g., compression type motion vectors obtained by using a block matching algorithm that goes to zero length for a threshold time within a parking zone. See "The H.264 Advanced Video Compression Standard", Iain E. Richardson, 2010 John Wiley & Sons Ltd., 25 pages. Within a frame associated with the parked vehicle, a region is selected for identification, i.e., candidate region, where the region is a collection of pixels that were last associated with the coherent cluster of motion vectors.

Using a background subtraction method for a static camera system being used to capture the video feed. When an image of the background void of any foreground objects is available, background removal computes the absolute intensity/color difference between the known background image and each image in the video sequence. Pixels for which the computed distance in the intensity/color space is relatively small are classified as background pixels. There are several techniques for background estimation such as those based on Gaussian mixture models, see C. Stauffer and W. E. L. Grimson, Adaptive background mixture models for real-time tracking; In Proc. of the 1999 Conference on Computer Vision and Pattern Recognition (CVPR '99), 6 pages, 1999; eigenbackgrounds which use principal component analysis, see Oliver, N. M.; Rosario, B.; Pentland, A. P., A Bayesian Computer Vision System For Modeling Human Interactions, IEEE Transactions on PAMI, pages 831-843; and computation of running averages, see B. P. L. Lo and S. A. Velastin, "Automatic congestion detection system for underground platforms", Proc. of 2001 Int. Symp. on Intell. Multimedia, Video and Speech Processing, pp. 158-161. These background estimation techniques gradually update the background as new frames become available.

C) Sliding Window Search and Window Classification 810

After a candidate region is identified, a sliding window search is performed in the candidate region as illustrated in FIG. 6. Examples of a sliding window search include, but are not limited to, a 2D, 3D, 4D (4 dimensional) space search and other multi-dimensional sliding window searches. For each search window, a set of features are extracted. These features can be extracted in many different ways including the following:

Dimensionality reduction techniques such as principal component analysis (PCA) or linear discriminant analysis (LDA);

Texture-based feature calculations such as histogram of oriented gradients (HOG), see N. Dalai and B. Triggs "Histograms of Oriented Gradients for Human Detection", CVPR 2005, 7 pages; local binary patterns (LBP), see T. Ojala, M. Pietikäinen, and D. Harwood, "A Comparative Study of Texture Measures with Classification Based on Feature Distributions", 1996 Pattern Recognition, vol. 29, pp. 51-59; and successive mean quantization transform features (SMQT), see M. Nilsson, J. Nordberg, and I. Claesson, "Face Detection Using Local SMQT Features and Split Up SNoW Classifier", *IEEE International Conference on Acoustics, Speech, and Signal Processing,* 2007, 4 pages;

Features based on color attributes, e.g., color histogram;

Scale invariant features such as scale invariant feature transform (SIFT) features or speeded up robust features (SURF);

Local image descriptors such as bag of visual words (BOV), see G. Csurka, C. Dance, J. Willamowski, L. Fan and C. Bray, "Visual Categorization with Bags of Keypoints", ECCV SLCV, 2004, 16 pages; and Fisher vectors, see F. Perronnin and C. Dance, "Fisher Kernels on Visual Vocabularies for Image Categorization", CVPR, 2007, 8 pages and F. Perronnin, J. Sánchez and T. Mensink, "Improving the Fisher Kernel for Large-Scale Image Classification", ECCV, 2010, 14 pages.

Any combination of the features listed above can be used to generate a final feature vector representative of a search window. A classifier receives the feature vector associated with a window as an input and assigns a score for each search window based on the feature vector. Examples of classifiers include, but are not limited to, a neural network classifier, a K-nearest neighbor classifier, a linear SVM classifier and a non-linear SVM classifier. The windows are classified as a "vehicle" or "non-vehicle" by comparing the score assigned by the classifier to the window with a predefined detection threshold value.

D) Window Elimination Via Window Shape Testing and/or Window Classification Score Degradation 815

Window elimination via window shape testing may be implemented in one or more of a plurality of manners. Window shape parameters and respective thresholds, such as aspect ratio, width, height, etc., can be optimized for a specific parking area context. For example, one parking area may receive a large number of deliveries from box trucks, step vans or other type of delivery vehicle and another area may be designated for motorcycles or compact cars. In addition, vehicle shape may be culture or country dependent. For example, some European cities may use trucks that are relatively small with aspect ratios different from common truck sizes in use in the United States. Shape dependence can also be time adaptive. For example, deliveries vehicles may be predominant at particular hours of the day in some parking areas. Examples of algorithms for shape testing are listed below:

Fixed Aspect Ratio Thresholding: The aspect ratio of search window are calculated and any of the windows with a calculated aspect ratio smaller than a predefined threshold is eliminated;

Adaptive Aspect Ratio Thresholding: The aspect ratio threshold is determined adaptively along a curb, for example, and a search window is eliminated if the determined aspect ratio is smaller than a threshold defined for the window location within the frame and/or ROI;

Physical Length Thresholding: The physical length of search windows is calculated and any windows with a length smaller than a predefined threshold, e.g., the smallest vehicle length, is eliminated.

Surrogated Physical Length Thresholding: A surrogate pixel width of search windows is calculated based on a learned look-up table (LUT) and any windows with a length smaller than a predefined threshold is eliminated, e.g., 90% of the smallest learned vehicle length in pixels.

Window Classification Score Degrading: The classification score is degraded as a function of the calculated aspect ratio, either fixed or adaptive. Score degrading eliminates the relatively difficult decision of eliminating potential window candidates while biasing the score of a candidate window to favor candidate windows with aspect ratios more aligned with typical vehicle dimensions. This approach may be less prone to errors when an unusually shaped vehicle is captured in the parking region of interest.

Figure 9:
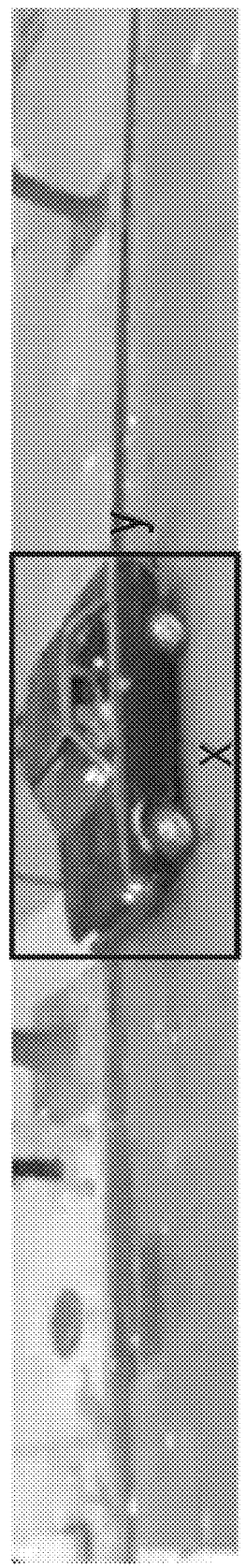
FIG. 9 illustrates a fixed aspect ratio threshold associated with sliding window, i.e., candidate window, according to an exemplary embodiment of this disclosure.

Another relatively straightforward method is to eliminate irrelevant windows based on a fixed aspect ratio where the aspect ratio r of a window is calculated as:

$$r=x/y$$

where x and y represent the width and height of a window, respectively, as shown in FIG. 9. The aspect ratio is calculated for each "vehicle" window and compared with a fixed threshold to determine irrelevant windows. The threshold may be determined based on the aspect ratio of the smallest car parked in the region of interest.

Figure 10:
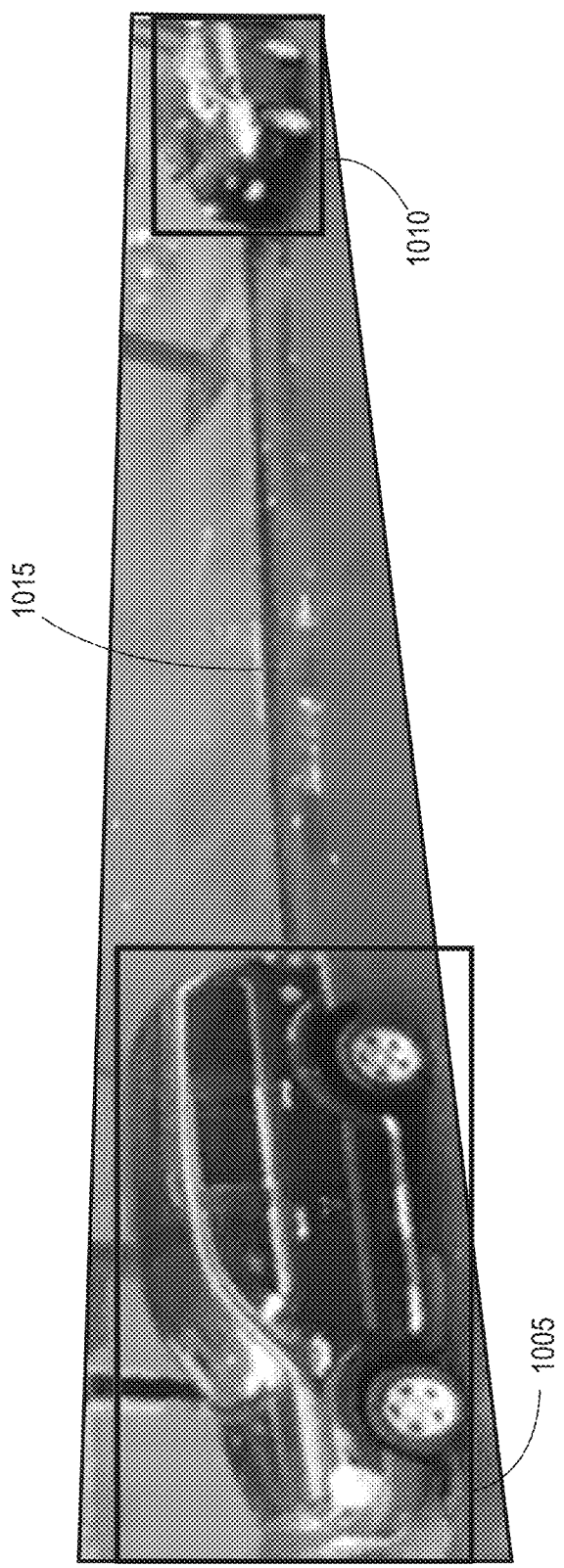
FIG. 10 illustrates a variable aspect ratio threshold associated with candidate windows according to an exemplary embodiment of this disclosure.

While the fixed aspect ratio thresholding is a simple and easy way for window elimination, normally it is not efficient enough to eliminate all irrelevant "vehicle" windows because the aspect ratio of vehicles parked at the near and far end of the parking region varies significantly, as illustrated in FIG. 10. Vehicles 1005 parked relatively close to a camera typically appear to have a larger aspect ratio on the image plane than vehicles 1010 parked at the far end. For example, the threshold is determined based on the aspect ratio of vehicles at the far end to retain "vehicle" windows detected at the far end, the threshold limits the ability of the fixed aspect ratio comparison to properly retain/eliminate "vehicle" windows is obviously not optimal for the cars at the near end.

One way to overcome the limitations associated with fixed aspect ratio thresholding is to use a variable aspect ratio threshold, for example, along a curb 1015. For this case, the aspect ratio threshold varies across the parking region and is higher for windows at the near end and lower end for windows located at the far end, relative to the position of the camera capturing the image shown in FIG. 10. The adaptive threshold may be designed during the process of training the classifier, i.e., offline phase. For example, during the training of a classifier for a specific camera configuration during the offline phase, positive (vehicle) and negative (non-vehicle) samples are collected from a common camera. Collecting the samples may be performed manually or may be performed in an automated fashion. See U.S. patent application Ser. No. 13/836,310, filed Mar. 15, 2013, by Wu et al., and entitled "Methods and Systems for Automated In-Field Hierarchical Training of a Vehicle Detection System". In any case, the aspect ratio and the location of positive samples on the image plane may also collect during this stage with minimal additional computation. Once a set of samples is collected from different locations within the region of interest, a linear or non-linear regression may be performed using the collected samples. See http://en.wikipedia.org/wiki/Regression_analysis.

Figure 11:
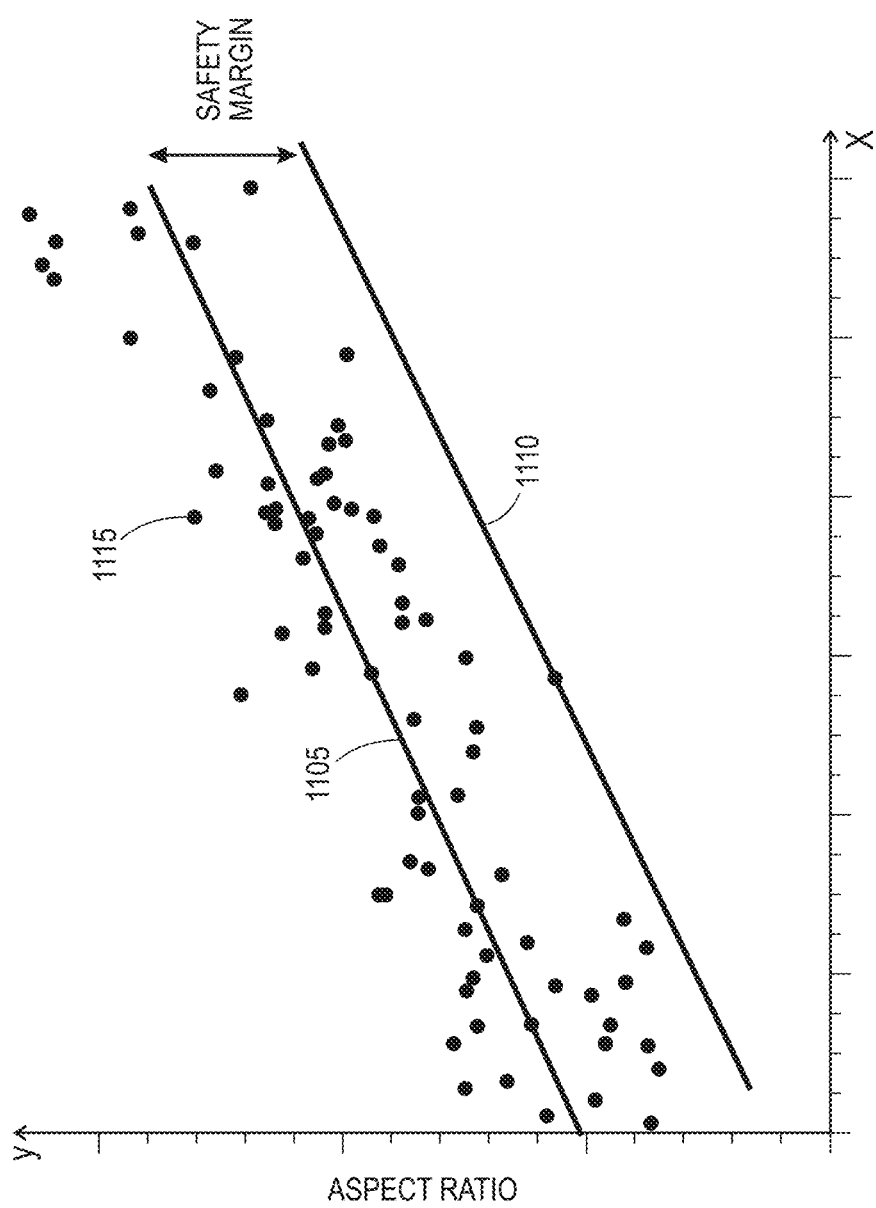
FIG. 11 is a linear regression plot of window location versus aspect ratio associated with a variable aspect ratio threshold to exclude, i.e., eliminate, candidate sliding windows according to an exemplary embodiment of this disclosure.

With reference to FIG. 11, illustrated is a linear regression plot. The y-axis in the figure specifies the aspect ratio of the vehicle samples and the x-axis specifies the location of the vehicle samples on the image plane. In FIG. 11, the location of a sample, for example sample 1120, is specified by the x-coordinate of the center of the sample. The top line 1105 of FIG. 11 is the least squares estimate of the samples. Based on the fitted line, the threshold can be determined as the bottom line 1110 in FIG. 11, which has the same slope as the least squares estimate, i.e., top line, with some shift. This shift is a safety margin to ensure that all windows with a reasonable aspect ratio are preserved.

Another way to perform window elimination is by using a physical length constraint. The constraint can be set to a shortest vehicle of interest. For example, if the sliding window is searching for a passenger car, the physical length constraint may set to 7 feet. On the other hand, if the sliding window is searching for a large truck, the constraint may set to 16 feet. The physical length of each "vehicle" window is calculated and compared with the length constraint, and any windows with a length shorter than the constraint are eliminated. The physical length of a window on the image plane can be estimated in several possible ways, including:

A camera calibration technique which maps pixel coordinates to real-world length units. According to this method, a camera is first calibrated offline to determine calibration parameters that link the 2-D (2-Dimensional) image coordinates of an image plane associated with the camera with the 3-D (3-Dimensional) physical world. This can be accomplished by many known methods. For example, in Z. Zhang, "A flexible new technique for camera calibration," IEEE Trans. On Pattern Analysis and Machine Intelligence, Vol. 22(11), 1330-1334 (2000), a method is provided to estimate a calibration model with 11 unknown parameters. The model is then applied to calculate a 3-D location in the physical world for any coordinate (x, y) in the image captured by the camera, together with an estimated z value. Once a candidate region is detected and its front and back ends are located, their 3-D coordinates are evaluated from the 2-D images using the camera model. The physical length of the candidate region can then be determined by simple arithmetic.

Figure 12:
FIG. 12 shows the use of two calibration tapes laid down on a street to estimate the physical length of a window on an image plane according to an exemplary embodiment of this disclosure.

Two calibration tapes laid down along the street. FIG. 12 shows two calibration tapes 1205 and 1210 with white markers in the field of view of a parking camera. The distance between the two white markers on a calibration tape is 2 feet. The inner tape is placed along the curb and the outer tape is placed along the end of the parking region on the road side. Using these calibration tapes two look-up tables (LUTs) are generated. The physical length of a window is then estimated using the two look-up tables. See U.S. patent application Ser. No. 14/070,812, filed Nov. 14, 2013, by Wang et al. and entitled "Method for Object Size Calibration to Aid Vehicle Detection for Video-Based On-Street Parking Technology".

Figure 13:
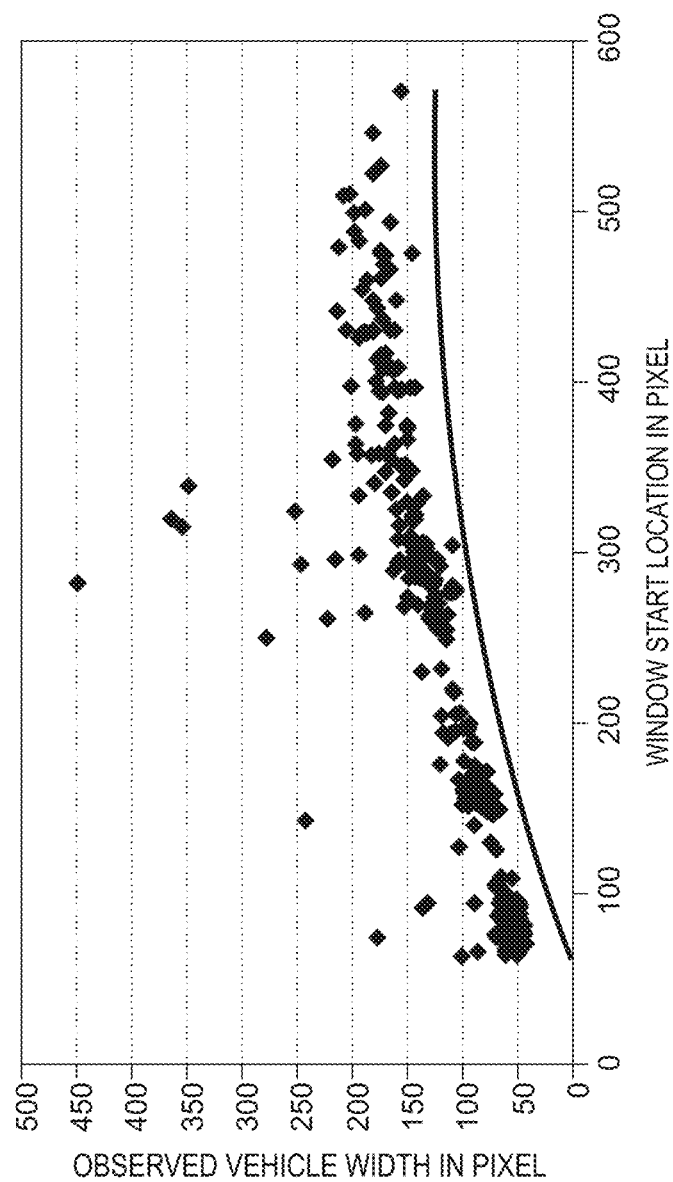
FIG. 13 is a plot of window start location in pixels versus observed vehicle widths in pixels associated with the site shown in FIG. 12.

Surrogated physical length constraint. According to this method, a constraint is set to the learned shortest vehicle of interest in pixel units. The procedure is similar to the physical length constraint except that a LUT is learned from the training samples that are used for training the SVM vehicle classifier. The surrogated physical length constraint method does not require actual use of physical calibration objects, thus the method is simple to deploy but is limited to the observed smallest vehicle. Consequently, it may be preferred to have a buffer such as a 10% discount of the learned LUT. To build the learned LUT, the pixel widths and their corresponding locations in the training samples are collected on site for the classifier. Plotting the data on an xy-axis, (x: representing pixel location, y: representing vehicle training sample pixel width), there is a lower-bound curve which corresponds to the observed smallest vehicles parked at various locations at the site in pixel units. FIG. 13 shows such data and the lower bound curve for the camera field of view shown in FIG. 12 after collecting approximately 10 days of data.

E) Non-Maximum Suppression 820

After eliminating irrelevant windows and/or performing window classification score degradation, there may still be more than one window classified as "vehicle" for a common vehicle. In order to select the window that best fits the vehicle, a well-known method in the literature called "non-maxima suppression" can be performed on the remaining "vehicle" windows. See A. Neubeck and L. V. Gool, "Efficient Non-Maximum Suppression", ICPR, 2006, 6 pages.

In one instantiation of non-maxima suppression, the suppression can be performed based on classification scores. In this case, all windows that overlap more than 50% with a higher score window are suppressed.

Figure 14:
FIGS. 14 and 15 are sample video frames illustrating a field of view associated with a camera A and camera B, respectively.
Figure 15:

The method disclosed herein was integrated with a video-based parking occupancy detection system implemented in Matlab and the efficiency of the algorithm(s) provided was tested using two video cameras installed on a city block with on-street parking. For purposes of this implementation, several days of video were initially recorded with a frame rate of 5 fps (frames per second) and a resolution of 640×512 dpi (dots per inch) to obtain positive and negative samples for training a SVM classifier for each camera. FIGS. 14 and 15 show the field of views of the cameras used to capture videos in the test city block.

Next, captured videos were manually scanned and positive and negative samples were extracted for training each camera, i.e., camera A (FIG. 14) and camera B (FIG. 15). From the positive and negative samples, HOG (Histograms of Oriented Gradients) features were calculated. The calculated features and class labels were then used to train a linear SVM classifier for each camera, i.e., classifier A and classifier B.

Figure 16:
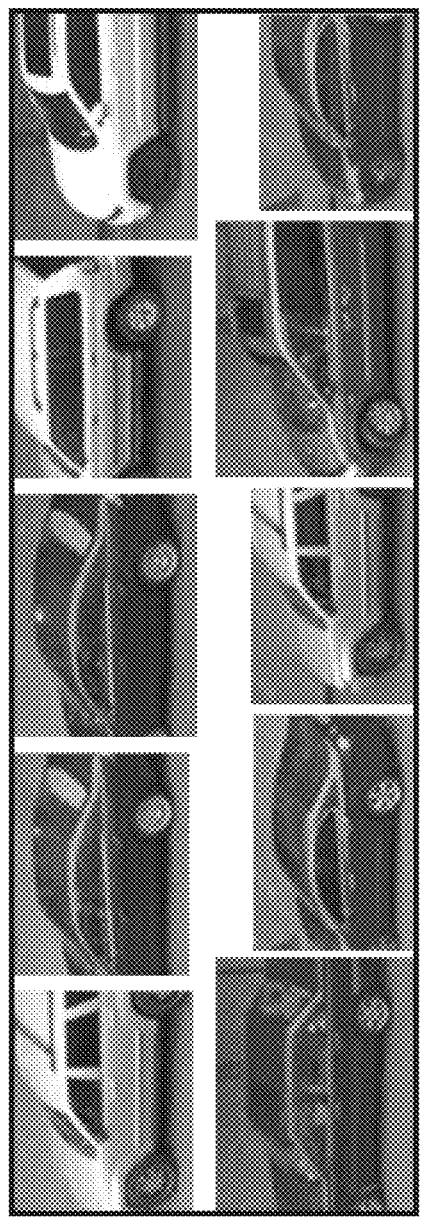
FIG. 16 includes samples of eliminated "vehicle" windows associated with camera A.
Figure 17:
FIG. 17 includes samples of eliminated "vehicle" windows associated with camera B.

After training the classifiers, the window elimination described herein was integrated with the overall video-based occupancy detection system for two days of video recorded for each camera. The videos were recorded from 8:00 am to 5:00 pm and the physical length constraint method was imposed for the purpose of window elimination. The length constraint was set to 12 ft. for both cameras. FIGS. 16 and 17 show the samples of eliminated "vehicle" windows for camera A and camera B, respectively. As shown in FIGS. 16 and 17, the eliminated windows all include partial detections of a parked vehicle. Notably, these partial detections are all classified as "vehicle" by the classifier but subsequently are eliminated by the window elimination module provided herein.

As previously discussed, for on-street parking vehicle detection and availability estimation, a classifier is used to detect vehicles parked, for example, along a curb. Since the classification is performed at many points using a sliding window context and size, there are several overlapping windows that are declared as including a vehicle. Conventional non-maximal suppression (NMS) chooses the optimal window to represent a vehicle, via a maximum classification score, and other overlapping windows are discarded. This works well when candidate windows have significant overlap. However, normal, i.e., traditional, NMS fails when a relatively very large vehicle, e.g., a fire truck, is parked next to a small car and the window overlap is only strong or substantial for one of the windows, e.g., the small car, which is also the window with the maximum score. In this instance, the larger window is erroneously suppressed, leading to a false negative vehicle detection.

Provided below is a method and system which provides an additional step to the standard non-maximal suppression algorithm. Instead of eliminating scored candidate "vehicle" windows that overlap a maximal windows, the algorithm initially degrades the class match scores of windows that overlap the maximal windows by an amount that is a function of the overlap area as well as the relative strength of the maximal windows. The score degradation is controlled to significantly decrease the scores of windows with reciprocal significant overlap but not strongly degrade the scores of non-maximal windows that overlap a large percentage of the maximal windows, where the maximal window does not overlap a large percentage of the non-maximal window.

Many classification algorithms provide exhaustive search for objects in a scene using a chosen classification method, e.g., a SVM classification.

The classification method is applied at many different locations each having many different context sizes for the search, ensuring that all occurrences of the object are found. However, this type of search results in many overlapping windows and a single object commonly results in multiple matches for similar window locations and geometries.

Non-maximal suppression is a common technique for winnowing down candidate matches for an area of object detection to a single and hopefully optimal match. The desired match is a selected window that provides nearly the smallest bounding rectangle of the object in the scene.

The reduction of multiple candidates is required because many classification techniques create a score above the classification threshold at several windows that enclose the object: the classifier is designed to match objects "similar to" a prototype, i.e., positive training samples, not just an exact match. If the classifier were to only detect a single window around an object, it would not be robust enough for interclass variation, thus increasing the false negative rate associated with the classifier.

Non-maximal suppression is very adept at eliminating windows that have significant overlap of both candidate windows—the maximal one and the non-maximal one. In many applications this type of overlap is the only type of overlap that occurs and non-maximal suppression performs well.

For vehicle classification, vehicles can vary significantly in size where very small vehicles are located next to large vehicles. If there is any overlap in the two vehicle windows and the smaller vehicle has an overly large window, traditional NMS can falsely suppress the larger vehicle window. Additionally, there is sometimes a false detection of a vehicle where a partial vehicle is detected as a full vehicle, which may assist in detecting occluded vehicles but provides a significant failure mode for other scenarios.

Figure 18:
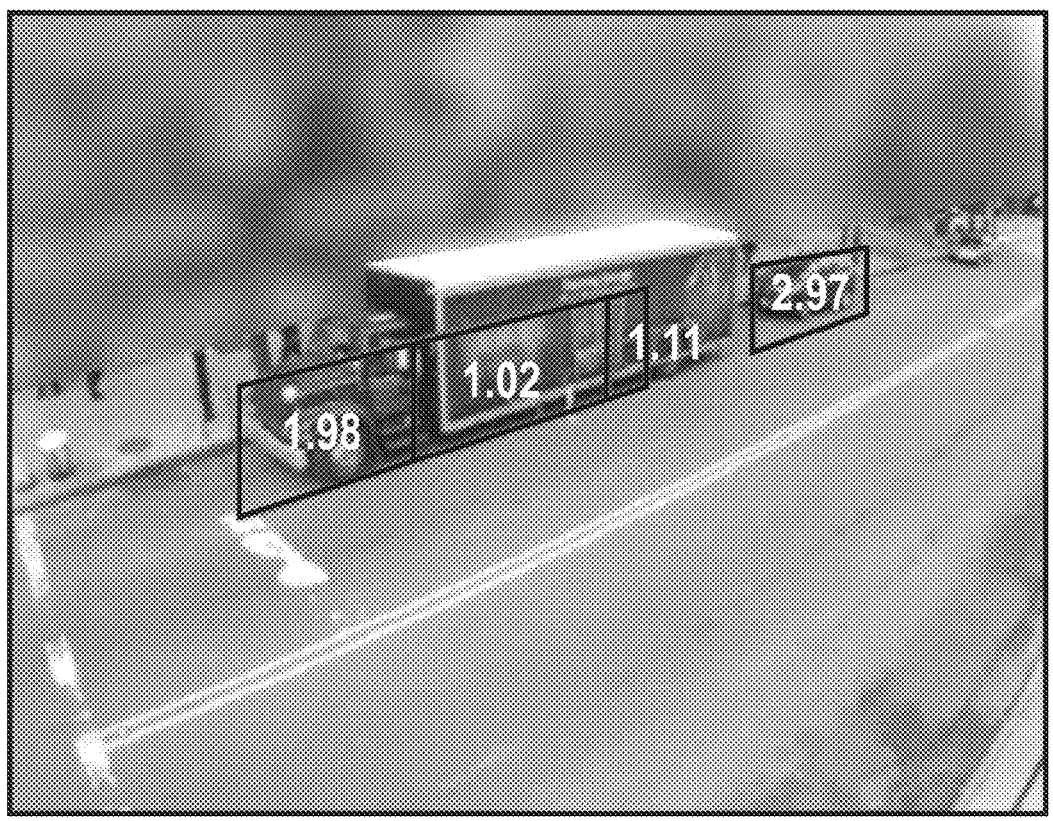
FIG. 18 illustrates vehicle detection with conventional NMS including the false elimination of a window including a portion of a truck, i.e., vehicle.
Figure 19:
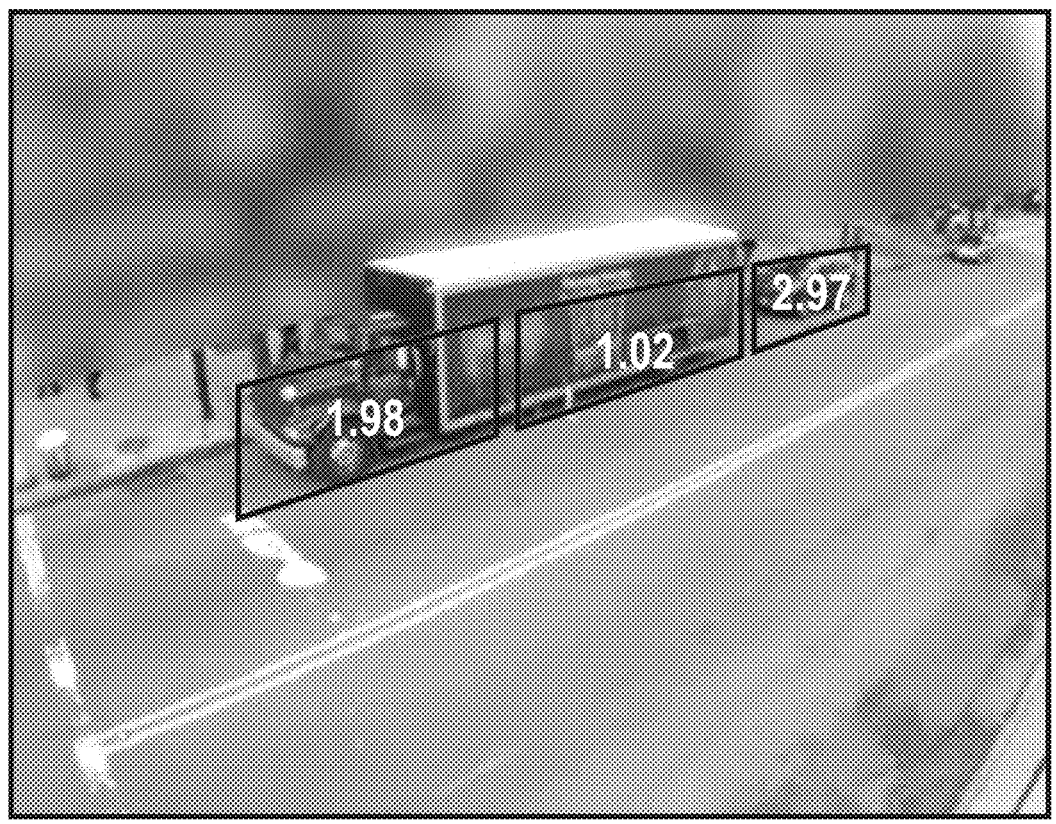
FIG. 19 illustrates vehicle detection of the truck shown in FIG. 17 using a modified NMS including score degradation according to an exemplary embodiment of this disclosure.

FIG. 18 shows an image including the classifier scores provided by an unmodified traditional non-maximal suppression algorithm which leads to false elimination of a detected window: FIG. 19 shows the same image processed using a modified non-maximum suppression method as further described below.

The modified NMS disclosed herein provides an algorithm that retains the functionality of traditional non-maximal suppression during standard operation but gracefully eliminates candidate window suppression in instances where an overlap of a maximum window and non-maximum window is significantly different from instances of windows overlap encountered in typical non-maximal suppression applications.

Traditional non-maximal suppression suppresses all non-maximal windows that significantly overlap the maximal windows which removes these windows as candidates for consideration as an object, i.e., vehicle, bounding box, i.e., if (area (window1 $\cap w_{max}$) > $\alpha$ min(area(window1, $w_{max}$)))

then eliminate window1 as a candidate,
where $w_{max}$ is a window corresponding to the maximal classification score and $\alpha$ is a fractional overlap criterion less than 1, such as 0.5.

The mechanism for elimination is strictly based on the fractional criterion overlap percentage a; it is not dependent on the relative sizes of the two windows. Notably, it is possible to add more complex rules of overlap to the traditional NMS but this would not lead to a graceful weakening of non-maximal suppression—it would shift the problem to other areas of the solution space.

The alternative provided here is to degrade all of the window scores using the maximum score of all the candidate windows, i.e., a global maximum. Here the degradation is a function of the overlap percentage and $score_{max}$, representing the global maximum score, where $$score_{window1} := score_{window1} - k \times (score_{max} - T + M) \times f\{area(window1 \cap w_{max})/area(window1)\} \quad (1)$$

where $score_{window1}$ is the score of a window to be modified, T is the threshold of the classifier for vehicle or not vehicle detection where the classifier score is compared to T, M is a distance margin or classification margin and k is a weighting factor related to the strength of the degradation.

Figure 20:
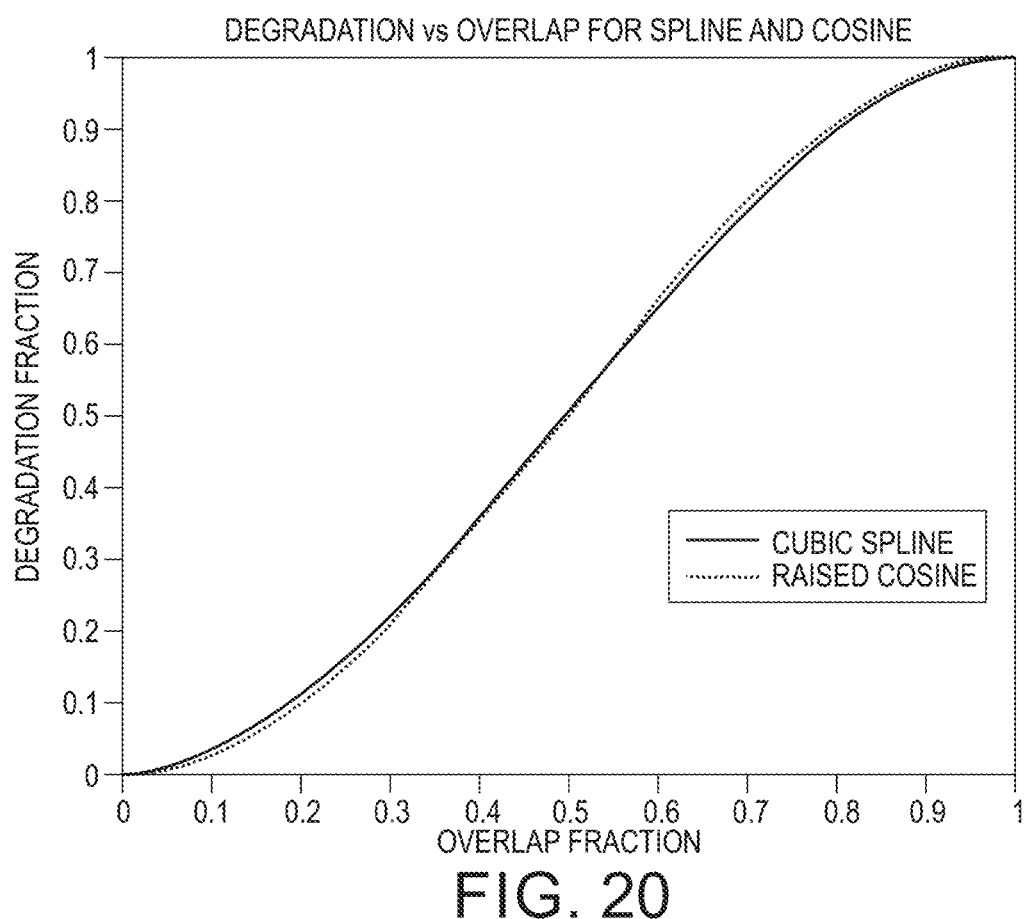
FIG. 20 is a weighting function f( ) plot of score degradation versus overlap for spline and cosine.

Typically M should be chosen based upon the nominal margin of the classifier. For a SVM classifier, this may be the distance between a decision boundary and the closest correctly classified true negative. The weighting function $f( )$ is a monotonically increasing function on the interval [0 1] with $f(0)=0$ and $f(1)=1$. In other words, the degradation increases with increasing window overlap and there is no score reduction for windows that are mutually exclusive with the global maximum score window. Some examples of a weighting function $f( )$ are the raised cosine, a cubic spline, or a sigmoid function. FIG. 20 shows a plot of degradation versus overlap for spline and cosine.

The heuristic used for generating equation (1) is that if an overlapping window has a high score it can be attributed to two factors: the score it inherits through sharing part of its context with the global maximum context and the score it generates in its area not shared with the global max context. Equation (1) tries to eliminate the contribution for the first factor by subtracting out the proportional component of the maximal score.

In equation (1), as long as M is positive and k≥1, which is typical, the global maximum window itself is degraded sufficiently to no longer classify as the desired object. Similarly, nearby objects are also significantly degraded and their modified score no longer qualifies the nearby objects as object detected windows.

Windows that do not overlap the window with the globally maximum score are not modified by equation (1) and continue to be candidates for object bounding boxes. Windows whose area only slightly overlaps the maximal score window, i.e., area (window1∩$w_{max}$)<<area (window1), only have their scores modified slightly and so most probably are still candidate windows even if the overlap significantly covers the maximum window, i.e., area (window1∩$w_{max}$)> $\alpha \times$area ($w_{max}$).

After an iteration of score degradation, a significant number of windows should be eliminated. Typically those windows eliminated are similar in size AND location to the global maximal window. Those that have overlap but differ significantly in either size or location are usually retained.

The process of window score degradation continues iteratively until no more candidate windows remain with a score above the classification threshold, T.

The process flow is shown below:
$score_{max}$=global maximum classification score
$w_{max}$=window associated with $w_{max}$
while ($score_{max}$>T (the classification threshold) {
  save $w_{max}$ as an object bounding window
  for every candidate window {
    update the score of the window using equation (1)
  }
  $score_{max}$=global maximum classification score
  $w_{max}$=window associated with $w_{max}$
  remove all candidate windows with scores<T (the classification threshold)
}.

Notably, the algorithm permits object bounding boxes to overlap—there is no explicit penalty for box overlap. The penalty is only implicit given the degradation term in equation (1).

For object types where overlapping windows are permitted, the algorithm is complete—all remaining windows are object bounding windows. For example, overlapping windows may be permitted for an application where occlusion occurs—finding books on a table for example.

For applications such as parking, where overlap is clearly prohibited, further processing is done to determine which windows to maintain, which to eliminate, and which to merge. For example, if two windows are both more than 50% overlapped, it is reasonable to merge the two windows. In cases where one window is overlapped greater than 50% overlapped and the other is not, it makes sense to retain the larger and thus less overlapped window and to eliminate the smaller window. This is the most common occurrence where score degradation will retain a true positive while non-maximal suppression would remove the window.

Figure 21:
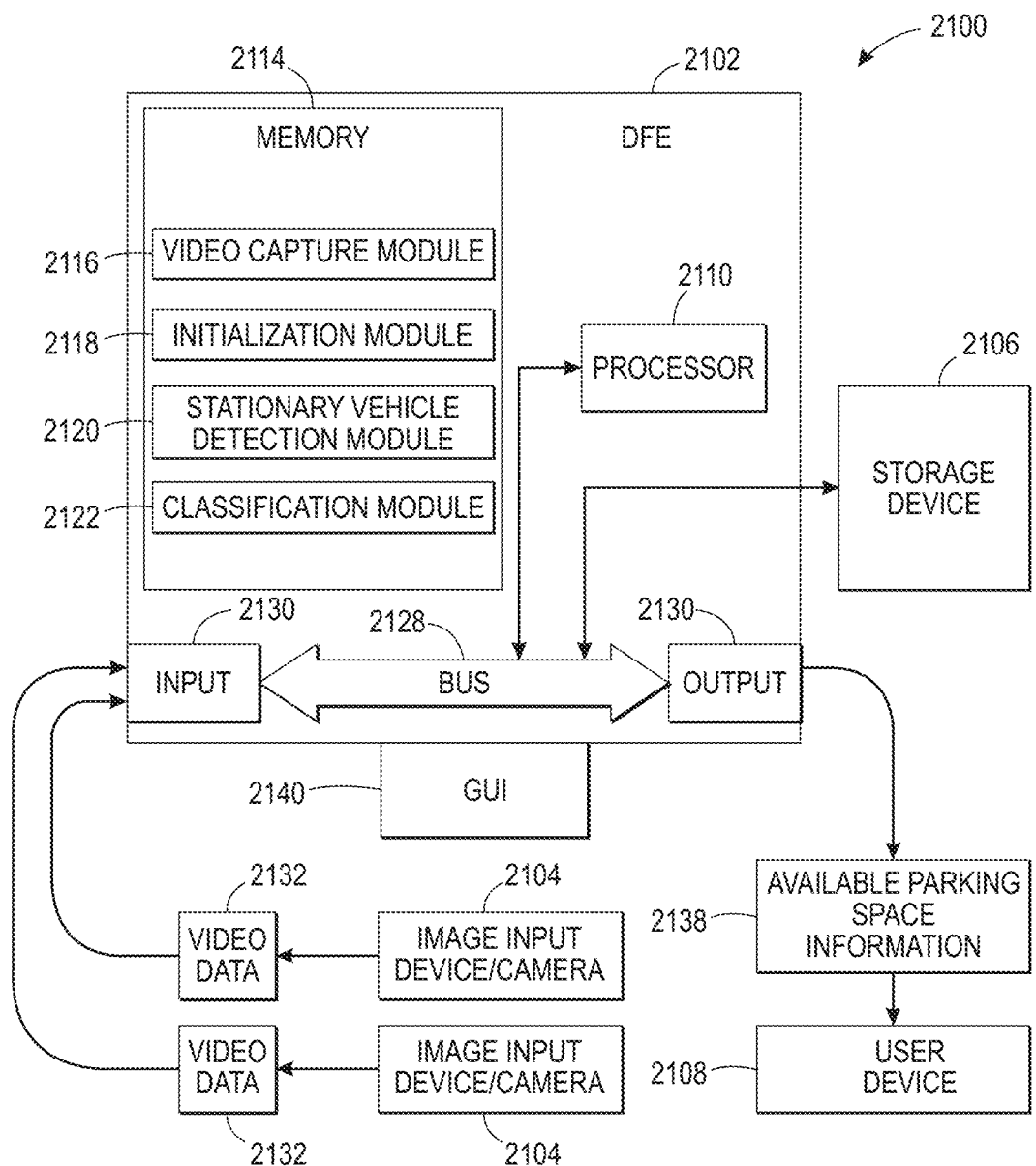
FIG. 21 is a block diagram of a vehicle detection system according to an exemplary embodiment of this disclosure.

FIG. 21 is a schematic illustration of a parking space determination system 2100 according to one exemplary embodiment, the system including a vehicle detection system as described herein. The system includes a determination device 2102, an image capture device 2104, and a storage device 2106, which may be linked together by communication links, referred to herein as a network. In one embodiment, the system 2100 may be in further communication with a user device 2108. These components are described in greater detail below.

The determination device 2102 illustrated in FIG. 21 includes a controller that is part of or associated with the determination device 2102. The exemplary controller is adapted for controlling an analysis of video data received by the system 2100. The controller includes a processor 2110, which controls the overall operation of the determination device 2102 by execution of processing instructions that are stored in memory 2114 connected to the processor 2110.

The memory 2114 may represent any type of tangible computer readable medium such as random access memory (RAM), read only memory (ROM), magnetic disk or tape, optical disk, flash memory, or holographic memory. In one embodiment, the memory 2114 comprises a combination of random access memory and read only memory. The digital processor 2110 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 2102, executes instructions stored in memory 2114 for performing the parts of a method discussed herein. In some embodiments, the processor 2110 and memory 2114 may be combined in a single chip.

The determination device 2102 may be embodied in a networked device, such as the image capture device 2104, although it is also contemplated that the determination device 2102 may be located elsewhere on a network to which the system 2100 is connected, such as on a central server, a networked computer, or the like, or distributed throughout the network or otherwise accessible thereto. The video data analysis, i.e. vehicle detection, phases disclosed herein are performed by the processor 2110 according to the instructions contained in the memory 2114. In particular, the memory 2114 stores a video capture module 2116, which captures video data of a parking area of interest; an initialization module 2118, which initializes the system; and a stationary vehicle detection module 2120, which detects vehicles that are in the parking area of interest; a classification module 2122, which classify whether a ROI includes a vehicle parked in the area of interest. Embodiments are contemplated wherein these instructions can be stored in a single module or as multiple modules embodied in the different devices.

The software modules as used herein, are intended to encompass any collection or set of instructions executable by the determination device 2102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 2102 may be all connected by a bus 2128.

With continued reference to FIG. 21, the determination device 2102 also includes one or more communication interfaces 2130, such as network interfaces, for communicating with external devices. The communication interfaces 2130 may include, for example, a modem, a router, a cable, and and/or Ethernet port, etc. The communication interfaces 2130 are adapted to receive video and/or image data 2132 as input.

The determination device 2102 may include one or more special purpose or general purpose computing devices, such as a server computer or digital front end (DFE), or any other computing device capable of executing instructions for performing the exemplary method.

FIG. 21 further illustrates the determination device 2102 connected to an image source 2104 for inputting and/or receiving the video data and/or image data (hereinafter collectively referred to as "video data") in electronic format. The image source 2104 may include an image capture device, such as a camera. The image source 2104 can include one or more surveillance cameras that capture video data from the parking area of interest. For performing the method at night in parking areas without external sources of illumination, the cameras 2104 can include near infrared (NIR) capabilities at the low-end portion of a near-infrared spectrum (700 nm-1000 nm).

In one embodiment, the image source 2104 can be a device adapted to relay and/or transmit the video captured by the camera to the determination device 2102. For example, the image source 2104 can include a scanner, a computer, or the like. In another embodiment, the video data 2132 may be input from any suitable source, such as a workstation, a database, a memory storage device, such as a disk, or the like. The image source 2104 is in communication with the controller containing the processor 2110 and memories 2114.

With continued reference to FIG. 21, the system 2100 includes a storage device 2106 that is part of or in communication with the determination device 2102. In a contemplated embodiment, the determination device 2102 can be in communication with a server (not shown) that includes a processing device and memory, such as storage device 2106.

With continued reference to FIG. 21, the video data 2132 undergoes processing by the determination device 2102 to output a determination 2138 regarding parking space availability to an operator in a suitable form on a graphic user interface (GUI) 2140 or to a user device 2108, such as a smart phone belonging to a driver in transit or to vehicle computer and/or GPS system, that is in communication with the determination device 2102. The GUI 2140 can include a display, for displaying information, such as the parking space availability and dimension, to users, and a user input device, such as a keyboard or touch or writable screen, for receiving instructions as input, and/or a cursor control device, such as a mouse, trackball, or the like, for communicating user input information and command selections to the processor 2110.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of detecting one or more vehicles in a video frame acquired from a fixed parking occupancy video camera including a field of view associated with a vehicle parking region, the computer implemented method comprising the steps of:
  a) capturing a video frame from the fixed parking occupancy video camera, the video frame including a ROI (Region of Interest) oriented by an orientation angle relative to an orientation of an image plane associated with the captured video frame, the ROI including one or more parking spaces of the vehicle parking region;
  b) performing a sliding window-based search for one or more vehicles within the ROI, the sliding window-based search extracting one or more features associated with each of a plurality of candidate search windows representing a set of windows from which one or more mutually exclusive object bounding boxes are selected, wherein each selected mutually exclusive object bounding box is associated with a vehicle, and wherein the vehicle is not associated with any of the other mutually exclusive object bounding boxes;
  c) accessing a classifier to classify each candidate search window as including a vehicle or not including a vehicle, wherein the classifier generates a score for each candidate window based on one or more features associated with each candidate search window, the score of each candidate search window degraded as a function of at least one of a fixed or an adaptive aspect ratio associated with each candidate search window; and
  d) suppressing one or more overlapping classified candidate search windows including a common vehicle having a classification score below a predetermined threshold, wherein overlapping candidate search windows are eliminated from detecting the common vehicle,
  wherein the classified candidate search windows are limited to candidate search windows of one or more predefined window shapes to exclude search windows limited to a partial detection of a vehicle, and candidate search windows which are not suppressed are considered to be the one or more mutually exclusive object bounding boxes representative of the one or more vehicles detected in the video frame.

2. The computer implemented method of detecting one or more vehicles in a video frame according to claim 1, wherein the candidate search windows are limited to windows associated with one or more of a predefined aspect ratio, length, height or surrogate pixel width.

3. The computer implemented method of detecting one or more vehicles in a video frame according g to claim 1, wherein the classifier is one of a neural network classifier, a K-nearest neighbor classifier, a linear SVM (Support Vector Machine) classifier and a non-linear SVM classifier.

4. The computer implemented method of detecting one or more vehicles in a video frame according to claim 1, the method comprising:
  performing steps a) - d) for a plurality of captured video frames.

5. The computer implemented method of detecting one or more vehicles in a video frame according to claim 1, wherein step b) performs the sliding window-based search along a longitudinal axis associated with the ROI, at various window widths.

6. The computer implemented method of detecting one or more vehicles in a video frame according to claim 1, wherein step d) performs NMS (Non-Maximum Suppression) to suppress one or more overlapping classified candidate search windows including a common vehicle.

7. The computer implemented method of detecting one or more vehicles in a video frame according to claim 1, wherein the classified candidate search windows are limited to candidate search windows of one or more predefined window shape(s) after step c) and before step d).

8. The computer implemented method of detecting one or more vehicles in a video frame according to claim 1, wherein the classified candidate search windows are limited to candidate search windows of one or more predefined window shape(s) before step c).

9. The computer implemented method of detecting one or more vehicles in a video frame according to claim 1, wherein the classifier is a SVM classifier, and wherein the candidate search window is eliminated as a function of either a fixed or adaption aspect ratio associated with each candidate search window.

10. The computer implemented method of detecting one or more vehicles in a video frame according to claim 9, wherein the fixed or adaptive aspect ratio is associated with typical dimensions of vehicles detected within the ROI.

11. A computer implemented method of detecting one or more vehicles in a video frame acquired from a fixed parking occupancy video camera including a field of view associated with a vehicle parking region, the method comprising:
  a) capturing a video frame from the fixed parking occupancy video, the video frame including a ROI (Region of Interest) oriented by an orientation angle relative to an orientation of an image plane associated with the captured video frame, the ROI including one or more parking spaces of the vehicle parking region;
  b) performing a sliding window-based search for one or more vehicles within the ROI, the sliding window-based search extracting one or more features associated with each of a plurality of candidate search windows representing a set of windows from which object bounding boxes are selected, wherein each selected object bounding box is associated with a vehicle, and wherein the vehicle is not associated with any of the other object bounding boxes;
  c1) accessing a classifier to score each candidate search window with a classification score calculated by the classifier indicating a probability of candidate search window includes a vehicle relative to a plurality of training images used to train the classifier;
  c2) degrading the classification score of one or more classified overlapping search windows including a common vehicle, the classification score degraded by an amount that is a function of an overlap area of the overlapping search windows and a relative size of each of the overlapping windows; and
  d) performing a NMS (Non-Maximal Suppression) process to suppress any overlapping classified candidate search window with a classification score below a predetermined threshold,
  wherein classified candidate search windows which are not suppressed are considered to be object bounding boxes representative of the one or more vehicles detected in the video frame.

12. The computer implemented method of detecting one or more vehicles in a video frame according to claim 11, wherein step c2) degrades the classification score of one or more classified overlapping search windows to significantly decrease the scores of a classified overlapping search window with significant reciprocal overlap with a respective maximal score classified search window, and step c2) does not significantly degrade the scores of a classified overlapping search window with a minimal reciprocal overlap with a respective maximal score classified search window.

13. The computer implemented method of detecting one or more vehicles in a video frame according to claim 11, wherein step c2) degrades the classification score of one or more classified overlapping windows including a common vehicle, the classification score degraded by an amount that is a function of an overlap area of area of the overlapping search windows, a relative size of each of the overlapping windows, and a global maximal classification score associated with the classified candidate search windows.

14. The computer implemented method of detecting one or more vehicles in a video frame according to claim 11, wherein step c2) degrades the classification score of one or more classified overlapping windows according to the equation $$\text{score}_{window1} := \text{score}_{window1} - k \times (\text{score}_{max} - T + M) \times f\{\text{area}(window1 \cap w_{max})/\text{area}(window1)\}$$

where
  $\text{score}_{window1}$ is a score of a window to be modified,
  T is a threshold for vehicle detection,
  M is a classification margin,
  $f\{\text{area}(window1 \cap w_{max})/\text{area}(window1)\}$ is a weighting function related to the area of overlap of window1 and $w_{max}$, and
  k is a weighting factor related to the strength of the degradation.

15. The computer implemented method of detecting one or more vehicles in a video frame according to claim 14, wherein the weighting function $f\{\text{area}(window1 \cap w_{max})/\text{area}(window1)\}$ is a monotonically increasing function where the degradation increases with increasing overlap and there is no score reduction for windows that are mutually exclusive with the global maximum score window.

16. The computer implemented method of detecting one or more vehicles in a video frame according to claim 14, wherein the weighting function is one of a raised cosine, a cubic spline and a sigmoid function.

17. The computer implemented method of detecting one or more vehicles in a video frame according to claim 11, wherein the classifier is one of a neural network classifier, a K-nearest neighbor classifier, a linear SVM (Support Vector Machine) classifier and a non-linear SVM classifier.

18. The computer implemented method of detecting one or more vehicles in a video frame according to claim 11, the method comprising:
  performing steps a) - d) for a plurality of captured video frames.

19. The computer implemented method of detecting one or more vehicles in a video frame according to claim 11, wherein step b) performs the sliding window-based search along a longitudinal axis associated with the ROI, at various widths.

20. The computer implemented method of detecting one or more vehicles in a video frame according to claim 11, wherein steps c2) and d) are performed iteratively to generate one or more mutually exclusive object bounding boxes representative of the one or more vehicles detected in the video frame, where classified candidate search windows which overlap and are not suppressed are merged to generate a mutually exclusive object abounding box.

21. A vehicle detection system associated with a vehicle parking region, the vehicle detection system comprising:
  a parking occupancy video camera directed towards the vehicle parking region; and
  a controller operatively associated with the parking occupancy video camera, the controller configured to execute computer instructions to perform a process of detecting a vehicle in a video frame including:
  a) capturing a video frame from the fixed parking occupancy video, the video frame including a ROI (Region of Interest) oriented by an orientation angle relative to an orientation of an image plane associated with the captured video frame, the ROI including one or more parking spaces of the vehicle parking region;

b) performing a sliding window-based search for one or more vehicles within the ROI, the sliding window-based search extracting one or more features associated with each of a plurality of candidate search windows representing a set of windows from which object bounding boxes are selected, wherein each selected object bounding box is associated with a vehicle, and wherein the vehicle is not associated with any of the other object bounding boxes;

c1) accessing a classifier to score each candidate search window with a classification score calculated by the classifier indicating a probability of candidate search window includes a vehicle relative to a plurality of training images used to train the classifier;

c2) degrading the classification score of one or more classified overlapping search windows including a common vehicle, the classification score degraded by an amount that is a function of an overlap area of the overlapping search windows and a relative size of each of the overlapping windows; and d) performing a NMS (Non-Maximal Suppression) process to suppress any overlapping classified candidate search window with a classification score below a predetermined threshold, wherein classified candidate search windows which are not suppressed are considered to be object bounding boxes representative of the one or more vehicles detected in the video frame.

22. The vehicle detection system according to claim 21, wherein step c2) degrades the classification score of one or more classified overlapping search windows to significantly decrease the scores of a classified overlapping search window with significant reciprocal overlap with a respective maximal score classified search window, and step c2) does not significantly degrade the scores of a classified overlapping search window with a minimal reciprocal overlap with a respective maximal score classified search window.

23. The vehicle detection system according to claim 21, wherein step c2) degrades the classification score of one or more classified overlapping windows including a common vehicle, the classification score degraded by an amount that is a function of an overlap area of area of the overlapping search windows, a relative size of each of the overlapping windows, and a global maximal classification score associated with the classified candidate search windows.

24. The vehicle detection system according to claim 21, wherein step c2) degrades the classification score of one or more classified overlapping windows according to the equation $$\text{score}_{window1} := \text{score}_{window1} - k \times (\text{score}_{max} - T + M) \times f\{\text{area}(window1 \cap w_{max})/\text{area}(window1)\}$$

where $\text{score}_{window1}$ is a score of a window to be modified,

T is a threshold for vehicle detection,

M is a classification margin, $f\{\text{area}(window1 \cap w_{max})/\text{area}(window1)\}$ is a weighting function related to the area of overlap of window1 and $w_{max}$, and k is a weighting factor related to the strength of the degradation.

25. The vehicle detection system according to claim 24, wherein the weighting function $f\{\text{area}(window1 \cap w_{max})/\text{area}(window1)\}$ is a monotonically increasing function where the degradation increases with increasing overlap and there is no score reduction for windows that are mutually exclusive with the global maximum score window.

* * * * *